US009158316B2

(12) United States Patent
Theiler

(10) Patent No.: US 9,158,316 B2
(45) Date of Patent: Oct. 13, 2015

(54) CONTROL LOOP ARRANGEMENT, CIRCUIT ARRANGEMENT AND METHOD OF REGULATING A LOAD-COUPLED CURRENT SOURCE AND THE SUPPLY VOLTAGE THEREFOR

(75) Inventor: Helmut Theiler, Lieboch (AT)

(73) Assignee: ams AG, Unterpremstaetten (AT)

( * ) Notice: Subject to any disclaimer, the term of this patent is extended or adjusted under 35 U.S.C. 154(b) by 256 days.

(21) Appl. No.: 13/994,688

(22) PCT Filed: Dec. 1, 2011

(86) PCT No.: PCT/EP2011/071495
§ 371 (c)(1),
(2), (4) Date: Aug. 14, 2013

(87) PCT Pub. No.: WO2012/079995
PCT Pub. Date: Jun. 21, 2012

(65) Prior Publication Data
US 2013/0314064 A1      Nov. 28, 2013

(30) Foreign Application Priority Data

Dec. 17, 2010   (DE) .......................... 10 2010 054 899

(51) Int. Cl.
*G05F 1/46*       (2006.01)
*G09G 3/34*       (2006.01)
(Continued)

(52) U.S. Cl.
CPC ................ *G05F 1/46* (2013.01); *G09G 3/3406* (2013.01); *H05B 33/089* (2013.01);
(Continued)

(58) Field of Classification Search
CPC .......................... G05F 1/46; H02M 2001/0067
See application file for complete search history.

(56) References Cited

U.S. PATENT DOCUMENTS 4,525,765 A * 6/1985 Brajder ............................ 361/88
6,166,929 A * 12/2000 Ma et al. ......................... 363/37
(Continued)

FOREIGN PATENT DOCUMENTS

DE       19950135 A1    4/2001
DE       10346528 A1    4/2004
(Continued)

*Primary Examiner* — Timothy J Dole
*Assistant Examiner* — Yusef Ahmed
(74) *Attorney, Agent, or Firm* — McDermott Will & Emery LLP

(57) ABSTRACT

A circuit arrangement includes a load current controller (10a) and a monitoring device (11a, 11b). The load current controller (10a) has its input side connected to a first reference signal connection (A6) and a load reference connection (A2), the latter being able to be coupled to an output of the current source (SQn) and being designed to provide a control signal (IB) at an output which is coupled to a control connection (A1) for controlling the current source (SQn). The control signal (IB) is determined on the basis of a comparison of a load current (IL) with a first reference signal (IL-REF, IREF, VREF). The monitoring device (11a, 11b) has its input side coupled to the output of the load current controller (10a) and to one of the inputs of the load current controller (10a). The monitoring device (11a, 11b) is designed to provide a feedback signal (RS) at an output coupled to the feedback connection (A3) on the basis of a comparison of the control signal (IB) with the load current (IL). The feedback connection (A3) provides an external feedback signal (ERS) for adjusting a load voltage (VL) which drops across the current source (SQn) and the load (LK) coupled thereto.

13 Claims, 17 Drawing Sheets

(51) Int. Cl.
*H05B 33/08* (2006.01)
*H02M 1/00* (2007.01)

(52) U.S. Cl.
CPC ... *H05B 33/0827* (2013.01); *G09G 2320/0233* (2013.01); *G09G 2320/041* (2013.01); *G09G 2320/0633* (2013.01); *G09G 2330/02* (2013.01); *G09G 2330/021* (2013.01); *G09G 2330/04* (2013.01); *G09G 2330/08* (2013.01); *H02M 2001/0067* (2013.01)

(56) References Cited

U.S. PATENT DOCUMENTS

| | | | | |
|---|---|---|---|---|
| 6,515,434 | B1* | 2/2003 | Biebl | 315/291 |
| 7,402,960 | B2* | 7/2008 | Kajita | 315/291 |
| 7,482,765 | B2* | 1/2009 | Ito et al. | 315/312 |
| 8,519,680 | B2* | 8/2013 | Murakami | 323/222 |
| 2004/0080273 | A1* | 4/2004 | Ito et al. | 315/77 |
| 2004/0211200 | A1* | 10/2004 | McMillan et al. | 62/186 |
| 2006/0027736 | A1* | 2/2006 | Ichino et al. | 250/214 R |
| 2007/0120506 | A1* | 5/2007 | Grant | 315/312 |
| 2007/0285031 | A1* | 12/2007 | Shteynberg et al. | 315/294 |
| 2008/0111528 | A1* | 5/2008 | Wang | 323/282 |
| 2009/0146932 | A1 | 6/2009 | Osaka | 345/82 |
| 2009/0187925 | A1* | 7/2009 | Hu et al. | 719/327 |
| 2010/0013395 | A1* | 1/2010 | Archibald et al. | 315/185 R |
| 2011/0234189 | A1* | 9/2011 | Tanihara et al. | 323/282 |
| 2012/0098454 | A1* | 4/2012 | Grotkowski et al. | 315/246 |
| 2012/0262082 | A1* | 10/2012 | Esaki et al. | 315/224 |
| 2014/0232271 | A1* | 8/2014 | Wiegele et al. | 315/127 |

FOREIGN PATENT DOCUMENTS

| | | |
|---|---|---|
| DE | 102006032247 A1 | 1/2007 |
| DE | 102006061885 A1 | 8/2007 |
| DE | 102010054899 A1 | 6/2012 |

* cited by examiner

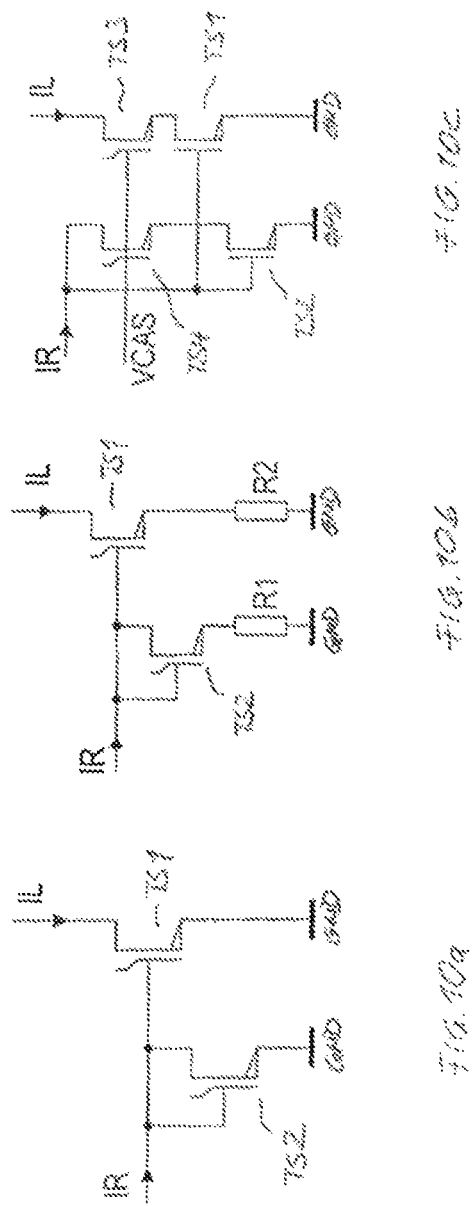

CONTROL LOOP ARRANGEMENT, CIRCUIT ARRANGEMENT AND METHOD OF REGULATING A LOAD-COUPLED CURRENT SOURCE AND THE SUPPLY VOLTAGE THEREFOR

TECHNICAL FIELD

The present invention relates to a circuit arrangement, the description thereof as a control loop arrangement and a method for regulating a current source coupled to a load.

BACKGROUND

The back-lighting in modern LCD panels (TVs, monitors) is generated by light-emitting diodes (LEDs). A large number of LEDs are required to achieve a homogeneous illumination of the entire screen. Multiple controlled current sources are used in order to deliver a load current that flows through the LEDs, which are arranged in LED chains. A corresponding arrangement can be found in FIG. 1, in which several current sources SQn are coupled to the LED chains LK. In order to reduce the power loss of the current sources SQn, the voltages VC are adjusted in such a manner that correct operation of the current sources SQn is just barely possible. For this purpose, the voltages VC are supplied to a DC/DC feedback circuit that evaluates the voltages VC and supplies the result of this evaluation to a DC/DC voltage regulator. Based on this input, the DC/DC voltage regulator transforms an input voltage VIN into an appropriate load voltage VL. The load voltage VL drops across the current source SQn and the load LK. This control loop has the effect that the current source SQn is operated at the desired operating point. Because the LED chains LK can all have a different voltage drop, all voltages VC are taken into account by the DC/DC control loop circuit. The decisive factor for the adjustment of the load voltage VL is the LED chain LK that has the highest voltage drop. The result of this is that an excessively high voltage VC is set for the remaining current sources SQn. This in turn leads to an increased power loss of the current sources in question.

The arrangement shown in FIG. 1 also has an LED monitor that checks whether an LED chain LK is interrupted or short-circuited. The detection of an interruption of an LED chain LK is necessary for such a control loop because the DC/DC feedback loop would otherwise raise the load voltage VL more and more. Because this effect leads to high power losses at the other current sources SQn, the interrupted LED chain LK must be switched off. The detection of a partial or complete short circuit in an LED chain LK is necessary in order to prevent thermal destruction of the affected current source SQn due to high power loss.

FIG. 2 shows the curves of the load voltage VL and the voltage VC for different operating situations. If an arrangement according to FIG. 1 is put into operation, the voltages VL and VC initially rise, until an optimum operating range (VCmin, VLmin) is reached. A typical load voltage runs in the range between 5 and 500 V, depending on the number of LEDs that are connected in series. Because the temperature, and therefore the voltage drop on the LED chains, varies in the course of operation, the load voltage VL also changes. FIG. 2 also shows different operating situations for the voltage VC (VC(a) to VC(e)). The difference between the voltage VL and the voltage VC designates the voltage drop on the corresponding LED chain LK. The voltage VC(a) shows an application case for dimming an LED chain LK. Dimming an LED chain LK is accomplished via a pulse-width modulation of the voltage signal VC. The pulse-width modulation switches the current source SQn on and off in defined time intervals and thus causes dimming of the LED chain LK. The load voltage VL is held constant. The voltages VC(b) and VC(c) show the voltage curve on different LED chains LK. This shows, for the sake of example, that the voltage drop at different LED chains LK can be of different magnitudes. VC(c) is the relevant voltage here for regulating the load voltage VL, because it has a lower value than the voltage VC(b). The voltage VC(d) shows an example for an LED chain that has an interruption. Therefore, the entire load voltage VL drops at the LED chain. There is no longer any voltage drop at the current source SQn. The voltage VC(e) shows a voltage curve for a partially short-circuited LED chain LK. Therefore, an increased voltage V(e) drops at the current source SQn due to the short circuit inside the LED chain LK and leads to an increased power loss.

From the descriptions for FIGS. 1 and 2, it follows that a DC/DC feedback circuit is necessary in order to reduce the voltage drop at the current sources SQn. Without this regulation, there is an excessively high loss of power at the current sources SQn. The detection of an interruption inside the LED chain LK is also necessary in order to exclude the relevant LED chain LK from the evaluation by the DC/DC feedback circuit. An interruption of the LED chain LK would otherwise lead to a falsified evaluation in the DC/DC feedback circuit and thus to an excessive load voltage VL. The recognition of a short circuit inside an LED chain LK is additionally necessary in order to protect the affected current source SQn from excessive power losses and therefore from thermal destruction. Furthermore, the current sources SQn should also be located outside of an integrated circuit in the case of load currents through the LED chains LK exceeding the value of 100 mA, because the power loss that occurs would be too high, particularly on smaller modules. This leads to an integrated control circuit that comprises the DC/DC feedback circuit and the LED monitor from FIG. 1 and external current sources SQn, which are electrically coupled to the integrated control circuit. The integrated control circuit acquires the voltages VC from the LED chains LK in order to adjust the DC/DC voltage regulator therewith and to be able to handle the LC monitoring functions. For this tapping of the voltages VC, however, the integrated monitoring circuit requires a connection that is designed even for high voltages.

SUMMARY

The problem of the present invention is to specify a circuit arrangement and a control loop arrangement for controlling a power source coupled to a load, in which a simplified circuit structure is possible without a high-voltage-capable connection and with a reduced number of connections to the current source and the load coupled thereto. An additional problem of the invention is to specify a simplified and more reliable method for controlling a current source.

This problem is solved with the subject matter of the independent claims. Refinements and configurations are the subject matter of the dependent claims.

The proposed control loop arrangement for controlling a current source supplying a load comprises a first control loop for regulating a control signal, which is designed to control the current source and thus a load current that flows through the current source and the load. In particular, the load is connected in series to the current source. The control variable of the first control loop corresponds to the load current or a variable derived from the load current. A first reference signal serves as the command variable of the first control loop. The control loop arrangement further comprises a second control loop for controlling a load voltage that drops across the current source and the load. The load current or the variable derived from the load current is the control variable of the second control loop. A control variable of the second control loop corresponds to the control signal or a variable derived from the control signal. This control loop arrangement obviates the necessity of providing a connection designed for high voltages in order to acquire a voltage at the current source. The load voltage is reliably adjusted.

In a refinement, the control variable of the first and second control loops is a control voltage that the load current generates at a reference resistor.

In an alternative embodiment, the control variable of the first control loop is the control voltage and the control variable of the second control loop is a second reference signal, which is determined as a function of the command variable of the first control loop.

In a refinement, the control loop arrangement comprises a short-circuit detector. It is designed to detect a short-circuit inside the load and to drive the first and second control loops on the basis thereof.

Another aspect of the invention relates to a circuit arrangement for controlling a current source that supplies a load. In particular, the load is connected in series to the current source. The circuit arrangement comprises at least one control terminal, a load reference terminal, a feedback terminal, a first reference signal terminal, a load current regulator and a monitoring device.

The control terminal is designed to provide a control signal for controlling the current source. The load reference terminal can be coupled to an output of the current source and is designed to provide a load current that flows through the load (e.g. an LED chain), or a variable derived from the load current. The variable derived from the load current can be a voltage that the load current generates at a resistor. The first reference signal terminal can be coupled to a first reference signal source. The latter is designed to provide a first reference signal that can correspond to a current or a voltage.

The load current regulator is coupled on the input side to the first reference signal terminal and the load reference terminal. It is designed to provide a control signal at an output coupled to the control terminal. The control signal is formed on the basis of a comparison of the load current or the variable derived from the load current to the first reference signal. The variable derived from the load current can correspond to a voltage that the load current generates in a resistor.

The feedback terminal is designed to provide an external feedback signal that is used to adjust a load voltage dropping across the current source and the load coupled thereto.

The monitoring device is coupled on the input side to the output of the load current regulator and one of the inputs of the load current regulator. The monitoring device is used to provide the feedback signal at an output coupled to the feedback terminal. The feedback signal is formed on the basis of a comparison of the control signal or a variable derived from the control signal to the load current or the variable derived from the load current. The control signal can be a control current. This is the case, for example, if the current source comprises a bipolar transistor. The control signal can also be a control voltage, in case the current source comprises a field-effect transistor. The variable derived from the control signal can be a control voltage that the control current or an emulation of the control current produces in a resistor. The variable derived from the load current can be a voltage that the load current produces in a resistor. Alternatively, the variable derived from the load current can also be a current that is adjusted in relation to the load current.

In a refinement, the one input of the load current regulator is coupled to the load reference terminal. The feedback signal is derived on the basis of the comparison of a first voltage, which an emulation of the control current generates at a resistor, to a second voltage, which the load current generates at another resistor.

In an alternative embodiment, the circuit arrangement comprises a second reference signal terminal, which can be coupled to a second reference signal source in order to supply a second reference signal. The one input of the load current regulator is additionally coupled to the second reference signal terminal. The second reference signal source is also electrically coupled to the first reference signal source. In this embodiment, the feedback signal is formed on the basis of a comparison of the emulation of the control current to the second reference signal, which is derived from the load current.

In another embodiment, the second reference signal can be adjusted on the basis of an additional circuit, the temperature behavior of which substantially corresponds to a temperature behavior of the current source. For this purpose, the additional circuit can comprise an emulation of the current source.

In a refinement, the circuit arrangement comprises a compensation circuit that is coupled to the load reference terminal. It is used to subtract the control signal from an output current derived from the current source. This has the effect that only the load current is provided to the load current regulator and the monitoring device for further regulation.

In a refinement, the circuit arrangement comprises a short-circuit detector that is coupled to the load reference terminal and the control terminal. The detector is designed to form a difference signal between the load reference terminal and the control terminal and to provide a short-circuit signal based on this difference signal and a third reference signal. With the aid of the short-circuit detector, the affected current source can be activated in order to prevent thermal overload and therefore a destruction of the current source.

In one embodiment, the current source comprises a transistor. Thus the difference signal between the load reference terminal and the control terminal corresponds to a base-emitter voltage.

Another aspect of the invention relates to a method for controlling a current source that supplies power to a load. In particular, the load is connected in series to the current source. In this method, a load current or a variable derived from the load current is first compared to a first reference signal. The load current is defined in that it flows through the load that is coupled to the current source. A control signal that controls the current source is provided on the basis of this comparison. The control signal or a variable derived from the control signal is further compared to the load current or the variable derived from the load current. On the basis thereof, a feedback signal is formed, which controls a load voltage that drops across the current source and the load.

In a refinement of the method, a gain factor is determined from the comparison of the control signal or the variable derived from the control signal to the load current or the variable derived from the load current. In one embodiment, the control signal corresponds to a control current and the gain factor corresponds to a current gain factor. The feedback signal is then provided as a function of the current gain factor.

In a refinement, the control signal is subtracted from an output current of the current source in order to obtain the load current for regulating the control signal and/or for determining the gain factor.

In another embodiment, a difference signal is formed, which can be picked off at terminals of the current source and which preferably corresponds to a base-emitter voltage of a transistor. This reference signal is compared to a third reference signal in order to detect a thermal overload, caused for example by a short circuit inside the load (LED chain). The third reference signal can additionally be adjustable. The adjustment of the third reference signal can also be temperature-dependent. The adjustment can be done manually or automatically.

The invention will be described in detail below for several embodiment examples with reference to the figures. Components and circuit elements that are functionally identical or have the identical effect bear identical reference numbers. Insofar as circuit parts or components correspond to one another in function, a description of them will not be repeated in each of the following figures.

BRIEF DESCRIPTION OF THE DRAWINGS

Therein:

FIG. 8 shows a general diagram of a control loop.

DETAILED DESCRIPTION

Figure 1:
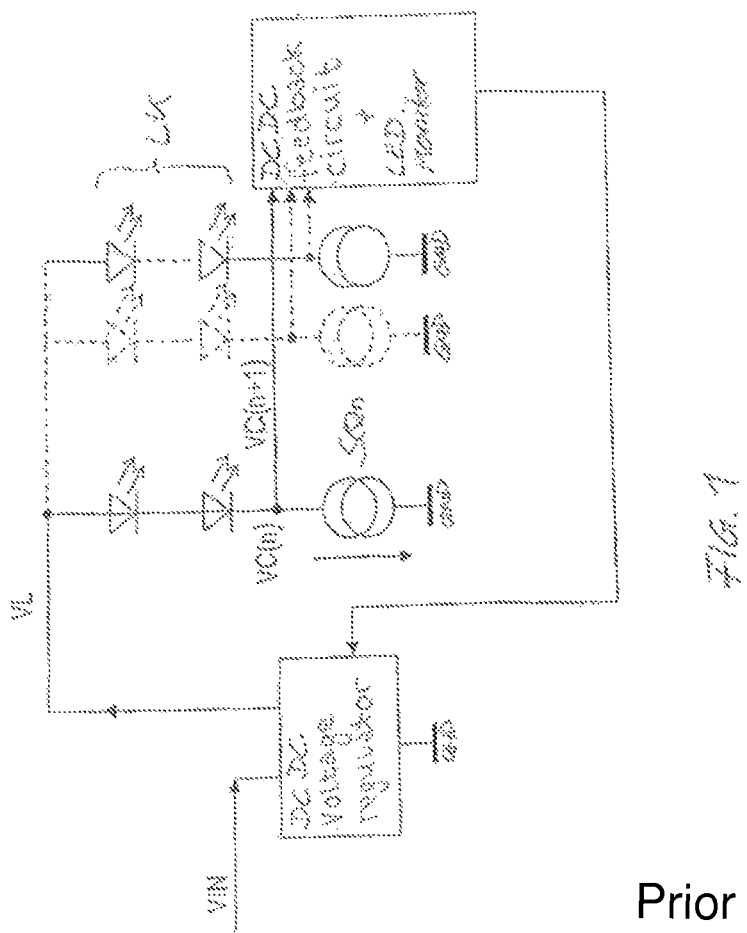
FIG. 1 shows a circuit arrangement for controlling LED chains, each coupled to a current source.
Figure 2:
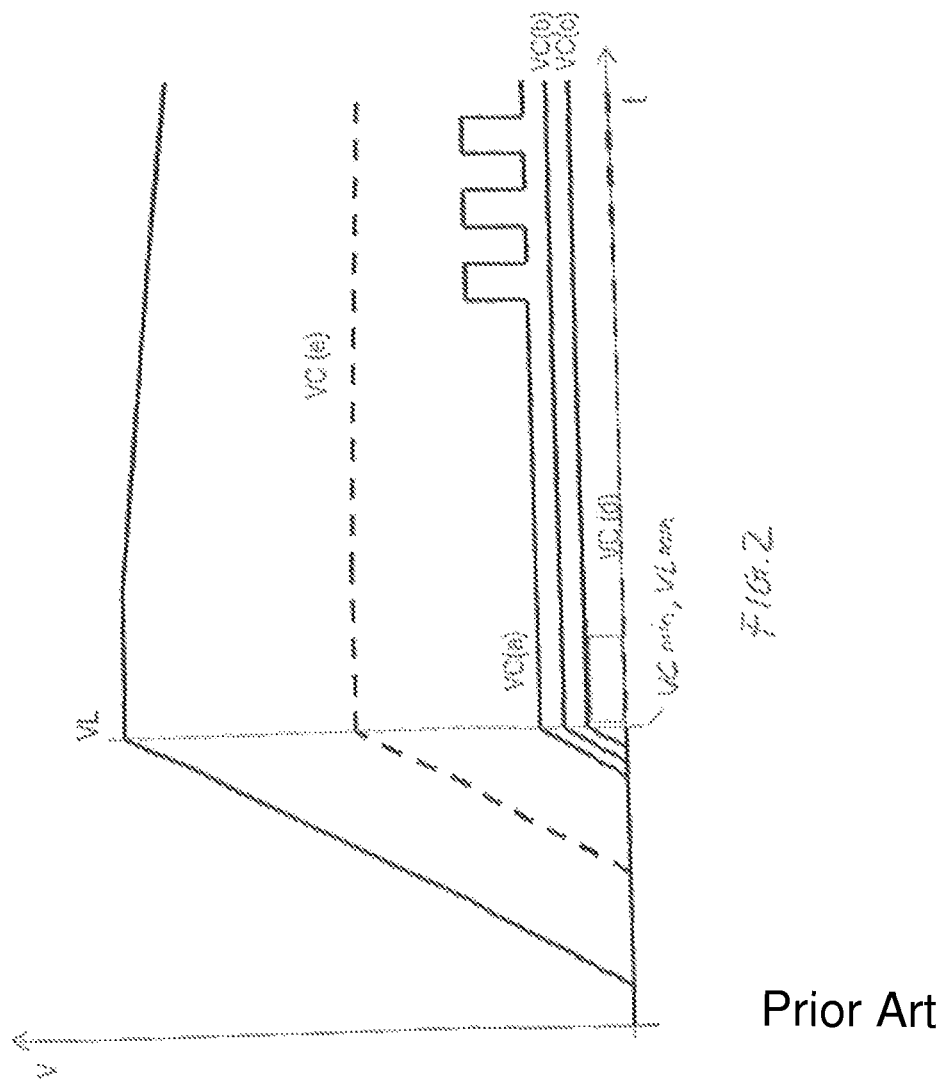
FIG. 2 shows the curve of the load voltage VL and the current VC from FIG. 1 for several operating situations.
Figure 3:
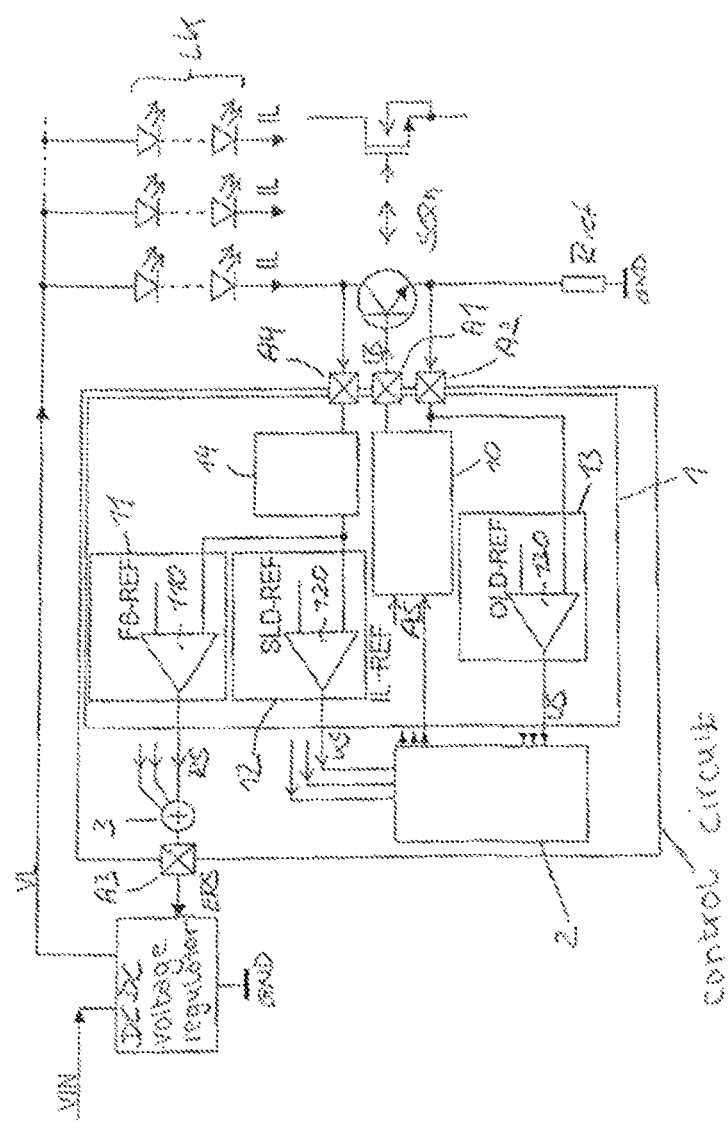
FIG. 3 shows an embodiment example of a circuit arrangement for controlling a current source coupled to a load.

FIG. 3 shows an example circuit arrangement for controlling a current source coupled to a load. FIG. 3 shows a control circuit for controlling a current source SQn, which is connected to the control circuit via the control terminal A1. The current source SQn in this example comprises a bipolar transistor SQn, the base which is connected to the control terminal A1. The bipolar transistor SQn is additionally connected via its emitter to a load reference terminal A2 of the control circuit. The emitter of the bipolar transistor SQn is connected via a reference resistor Rref to the reference potential terminal GND. The collector of the bipolar transistor SQn is coupled to an LED chain LK and a high-voltage terminal A4 of the control circuit. The LED chain LK comprises several LEDs.

Alternatively, the current source SQn can also comprise a field-effect transistor. In this embodiment, the gate of the field-effect transistor is connected to the control terminal A1, the drain terminal of the field-effect transistor is connected to the high-voltage terminal A4, and the source terminal of the field-effect transistor is connected to the load reference terminal A2.

The control circuit further comprises a feedback terminal A3, via which the control circuit is connected to a direct current/direct current voltage regulator, hereinafter referred to as a DC/DC voltage regulator. The DC/DC voltage regulator is coupled to the reference potential terminal GND and comprises an input for feeding an input voltage VIN. The DC/DC voltage regulator is coupled to the LED chains LK at its output.

For each LED chain LK or current source SQn, the control circuit comprises one current source controller 1 with a control terminal A1, a load reference terminal A2 and a high-voltage terminal A4. Thus, three terminals are required for each current source SQn. The control circuit further comprises a channel controller 2, which is coupled at its inputs and outputs to all power source controllers 1.

The control circuit further comprises an adder 3, which is coupled at its inputs to all current source controllers 1 and is coupled at its output to the feedback terminal A3, in order to provide an external feedback signal ERS.

The current source controller 1 comprises a load current regulator 10, a monitoring device 11, a short-circuit detector 12, an interruption detector 13 and a high-voltage circuit 14.

A first reference signal IL-REF is supplied to the load current regulator 10 at one input. A voltage at the load reference terminal A2, which drops across the reference resistor Rref, is supplied to the load current regulator 10 at another input. Based on a comparison of this voltage to the first reference signal IL-REF, the load current regulator provides a control signal IB at its output, which is connected to the control terminal A1.

The monitoring device 11 is coupled at one input via the high-voltage circuit 14 to the high-voltage terminal A4. The monitoring device 11 compares the signal provided by the high-voltage terminal A4 to the reference signal FB-REF and provides a feedback signal RS at its output. The feedback signal RS is routed to the adder 3, which provides the external feedback signal ERS at its output, taking into account all feedback signals RS from all current source controllers 1. The DC/DC voltage regulator generates a load voltage from the input voltage VIN on the basis of the external feedback signal ERS. The load voltage drops across the LED chain LK, the current sources SQn and the reference resistors Rref. By selecting a suitable reference signal FB-REF, the monitoring unit 11 can therefore adjust a suitable operating range for the current sources SQn.

The short-circuit detector 12 is coupled at its input to the high-voltage terminal A4 via the high-voltage circuit 14. The short-circuit detector 12 comprises a comparator 120, which compares the signal provided by the high-voltage terminal A4 to a third reference signal SLD-REF and provides a short circuit signal KS based on this comparison. The short-circuit signal KS is routed together with short-circuit signals KS of the other current source controllers 1 to the channel controller 2. The channel controller 2 in turn evaluates the short-circuit signal KS and provides activation signals AS to the current source controllers 1 at its outputs. The load current regulator 10 is turned on or off with the aid of this activation signal AS. If a short circuit is detected inside the LED chains LK, the corresponding current source SQn is deactivated with the signal in order to avoid a thermal destruction of the transistor.

The interruption detector 13 is coupled at one input to the load reference terminal A2. The interruption detector comprises a comparator 130 that compares the signal provided by the load reference signal terminal A2 to an interruption reference signal OLD-REF. On the basis of this comparison, the comparator 130 provides an interruption signal US at its output. It is routed together with the interruption signals US of the other current source controllers 1 to the channel controller 2. The channel controller 2 evaluates the interruption signals US and provides the activation signals AS at its outputs. If an interruption inside an LED chain LK is recognized, the relevant load current regulator 10 can be deactivated with the signal, or at least the output RS of the affected channel can be disconnected from the adder.

In this circuit arrangement, three terminals are required for each current source SQn: the control terminal A1, the load reference terminal A2 and the high-voltage terminal A4. Moreover, the high-voltage terminal A4 must be designed for high voltages. Consequently, the special high-voltage circuit 14 is also required.

Figure 4:
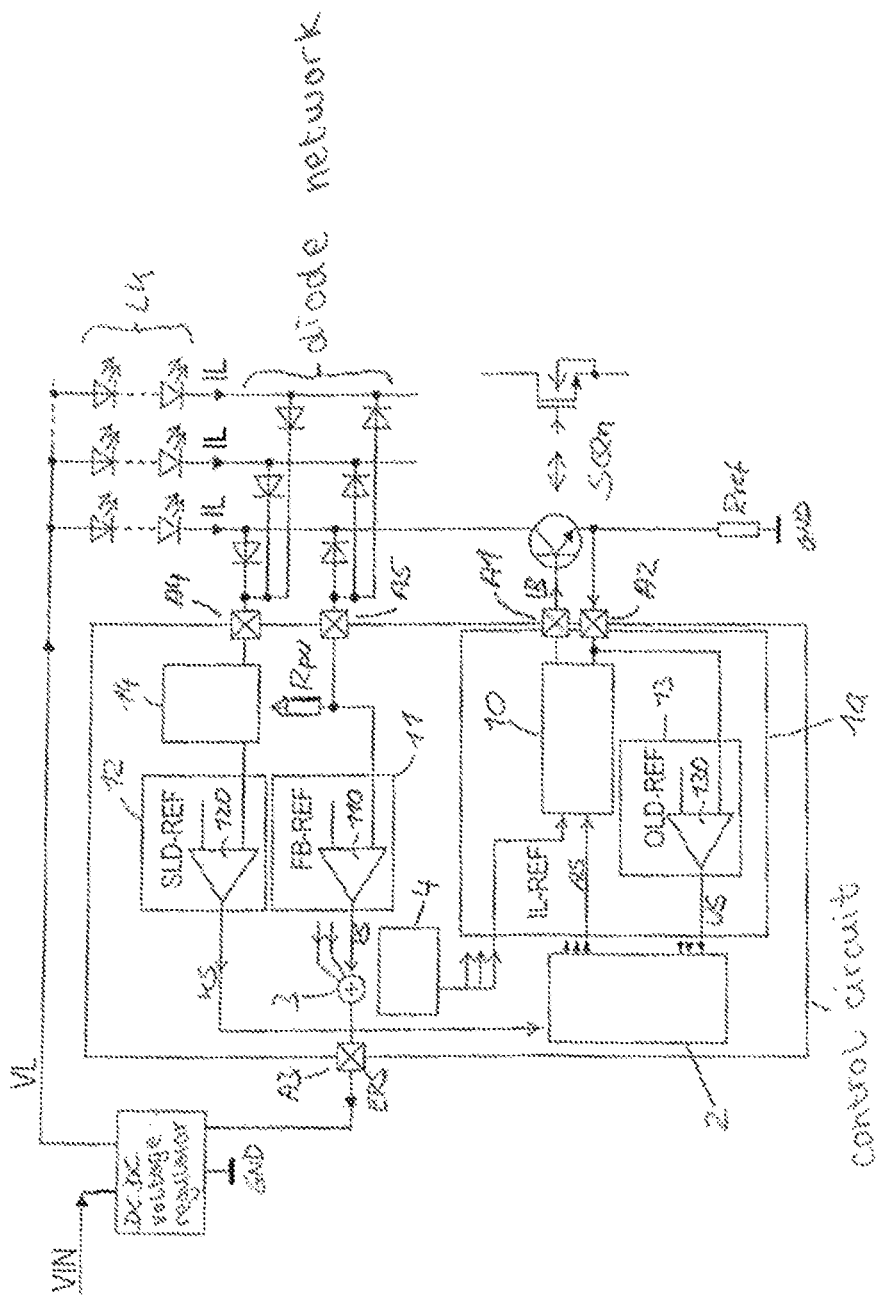
FIG. 4 shows another embodiment example of a circuit arrangement for controlling a current source coupled to a load.

FIG. 4 shows another circuit arrangement for controlling a current source SQn coupled to a load LK. Figure shows a control circuit that is coupled via control terminals A1, load reference terminals A2, a high-voltage terminal A4 and an additional terminal A5 through the current sources SQn and the LED chains LK. The control terminal A2 and the load reference terminal A2 are provided separately for each current source SQn or each LED chain LK. FIG. 4 shows the control terminal A2 and the load reference terminal A2 for one current source SQn for the sake of example. The high-voltage terminal A4 is constructed only once for all LED chains LK. The same applies to the additional terminal A5. The current source SQn is constructed as a bipolar transistor in FIG. 4. The base of the bipolar transistor is connected to the control terminal A1 and the emitter of the bipolar transistor is connected to the load reference terminal A2. The emitter is also connected via a reference resistor Rref to the reference potential terminal GND.

The current source SQn can alternatively also be configured as a field-effect transistor. In this embodiment, the gate of the field-effect transistor is coupled to the control terminal A1 and the source of the field-effect transistor is coupled to the load reference terminal A2.

An LED chain LK, which consists of several LEDs for back-lighting LCD panels, is coupled to the collector of the bipolar transistor SQn.

The control circuit is also coupled via a feedback terminal A3 to a DC/DC voltage regulator. The DC/DC voltage regulator is connected to the reference potential terminal GND and converts an input voltage VIN at one input into a load voltage VL at an output of the DC/DC voltage regulator that is coupled to the LED chains LK.

The control circuit also comprises a respective current source controller 1a for each current source SQn present. The current source controller 1a is coupled via control terminal A1 and the reference terminal A2 to the current source SQn. The current source controller 1a is connected on the input side to a reference circuit 4. The current source controller 1a is also connected on the input side and the output side to a channel controller 2.

The current source controller 1a comprises a load current regulator 10 and an interruption detector 13. The load current regulator 10 is connected on the input side to the reference circuit 4 for feeding a first reference signal IL-REF. An additional input of the load current regulator 10 is connected to the load reference terminal A2. The load current regulator 10 compares the first reference signal IL-REF to a signal that can be picked off at the load reference terminal A2. Depending on this comparison, the load current regulator 10 provides a control signal IB at an output that is connected to the control terminal A1.

The interruption detector 13 is connected on the input side to the load reference terminal A2. The interruption detector 13 comprises a comparator 130, which compares a signal that can be picked off at the load reference terminal A2 to an interruption reference signal OLD-REF. As a result, the comparator 130 provides an interruption signal US at its output, which is routed to the channel controller 2. The channel controller 2 evaluates the interruption signals US of all current source controllers 1a and provides activation signals AS at its outputs, which are connected to the load current regulators 10 of the current source controllers 1a. With the aid of this activation signal A5, the load current regulator 10 can be switched off if an interruption inside the LED chain LK is determined. Alternatively to switching off the channel in question, it can be decoupled at its output RS from the adder.

The control circuit further comprises a monitoring device 11 for setting the correct load-voltage VL. For this purpose, the monitoring device 11 is connected on the input side via a pull-up resistor Rpu to the additional terminal A5. The additional terminal A5 is in turn connected via a diode network to all LED chains LK. The monitoring device 11 comprises a comparator 110. The comparator 110 compares a signal that can be picked off at the additional terminal A5 to a reference signal FB-REF and provides a feedback signal RS at its output based on this comparison. This feedback signal RS is routed to the feedback terminal A3, which in turn routes an external feedback signal ERS to the DC/DC voltage regulator. The DC/DC voltage regulator converts the input voltage VIN into the load voltage VL on the basis of the external feedback signal ERS. The load voltage VL lies in the range from 5 to 500 V, depending on the number of LEDs used in the LED chain LK. Thus, an optimal voltage at the collector of the bipolar transistor SQn can be adjusted by the monitoring device 11.

The control circuit further comprises a short-circuit detector 12. The short-circuit detector 12 is electrically coupled on the input side via a high-voltage circuit 14 to the high-voltage terminal A4. The short-circuit detector 12 comprises a comparator 120, which compares the signal that is provided by the high-voltage circuit 14 to a third reference signal SLD-REF and on the basis thereof provides a short-circuit signal KS at an output. The short-circuit signal KS is routed to the channel controller 2, which then controls the load current regulators 10 via the activation signal AS. When a short circuit is detected inside an LED chain LK, the load current regulators 10 are deactivated in order to prevent destruction of the current source SQn. Because only the highest potential of the LED chains LK involved can be picked up by the diode network that is connected to the high-voltage terminal A4, a selective short-circuit recognition of the LED chain LK is not possible. This means that all load current regulators 10 have to be deactivated when a short circuit occurs inside one LED chain LK. In addition, the high-voltage terminal A4 must be designed for high voltages. Because of the possibility of high voltages at the high-voltage terminal A4, the special high-voltage circuit 14 continues to be necessary.

Figure 5:
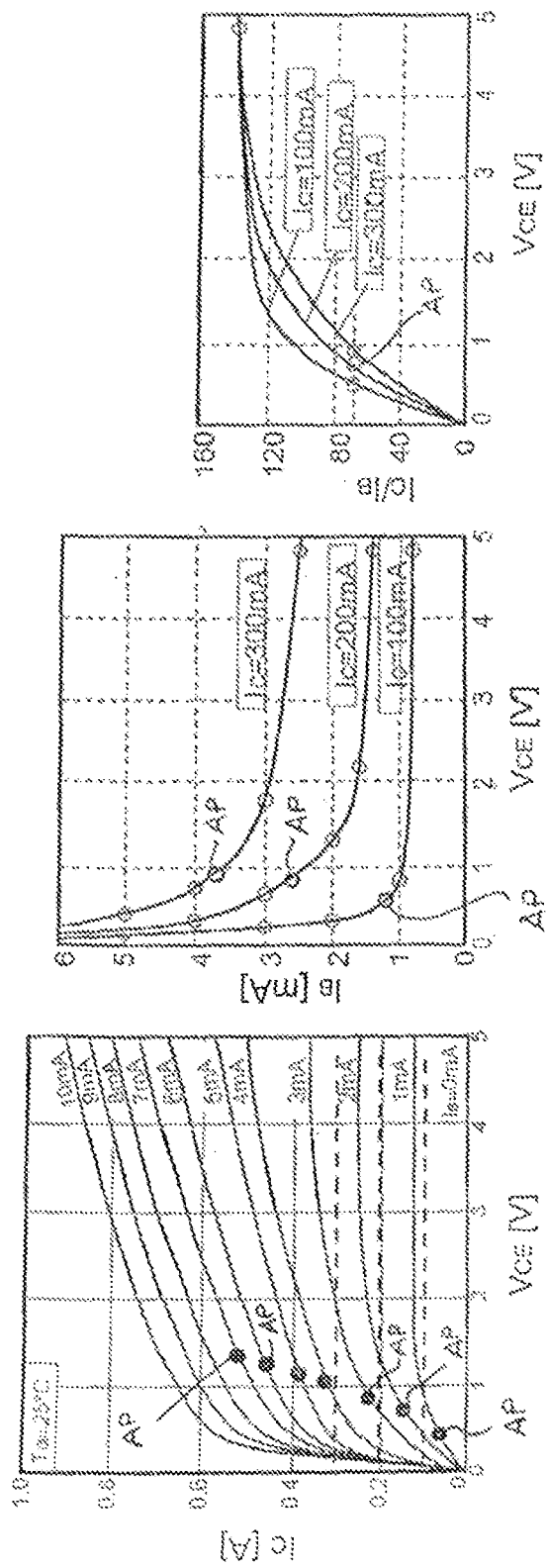
FIG. 5 shows example characteristic curves of a bipolar transistor.

An important task of the monitoring device 11 is to reduce the load voltage VL to the lowest possible value at which the current sources SQn still function properly. A good definition for this minimum voltage is the point at which the transistor of the current source SQn begins to lose its nominal current gain. These ideal operating points are provided with the designation AP in FIGS. 5A-5C. FIGS. 5A-5C show example characteristic curves of an NPN bipolar transistor. FIG. 5A shows the collector current IC as a function of the collector-emitter voltage VCE. Different characteristic curves for a fixed base current IB are shown. If the collector-emitter voltage VCE falls below a value marked with the operating points AP, the collector current IC collapses, and therefore the current gain as well. In this case, the collector-emitter voltage VCE must again be corrected upward. If the collector-emitter voltage VCE rises to an excessively high value, then the power loss of the NPN transistor increases. In this situation, the collector-emitter voltage VCE must be readjusted back to smaller values.

The same information can be derived from FIG. 5B, in which the base current IB is plotted versus the collector-emitter voltage VCE. It can be seen that the base current IB is optimally set to values that are marked AP in FIG. 5B. In these points, an optimally high current gain IB to IC is achieved with the lowest possible collector-emitter voltage VCE.

This becomes even clearer based on the characteristic curve from FIG. 5C, in which the current gain IC/IB is plotted versus the collector-emitter voltage VCE. If the current gain IC/IB falls below a value marked with the designation AP in FIG. 5C, the monitoring device 11 must raise the load voltage VL and thus the collector-emitter voltage VCE to a higher level. If the current gain IC/IB increases to a higher value than AP, the monitoring device can reduce the load current VL and thus the collector-emitter voltage VCE back down to a lower value in order to reduce the lost power. Thus the current gain factor, with which the base current IB is compared to the collector current IC of the current source, constitutes a good control parameter. Alternatively, the base current IB can also be compared to the emitter current of the current source.

In one embodiment, the regulation is based on the monitoring of a current gain factor, which compares a current that flows through the LED chain LK to the base current of the current source SQn. Thus, the load voltage VL is set to an ideal voltage at which the current source SQn has as low a power loss as possible, and at which the current source SQn still has a good current gain for an effective operation of the current source SQn.

This current gain factor can be determined in the circuit arrangement in various manners. First, the current gain factor can be defined as a constant factor in the circuit design. Second, there is the possibility of making the current gain factor adjustable via a digital or analog interface. This can also be done, for example, via an external adjustable resistor. The ideal current gain factor can additionally be determined directly from the characteristic curve of the bipolar transistor. This possibility will be explained with reference to FIG. 5B. If the collector-emitter voltage VCE or the load voltage VL is incrementally lowered, then the changes of the base current IB are very low as long as relatively large values of the voltage VCE are present. If the collector-emitter voltage VCE is lowered below values of the operating points AP, then the base current IB increases sharply. With the increasing base current IB, the current gain IC/IB decreases sharply. Therefore, the transistor is in the saturation region. The optimum current gain IC/IB and thus the operating points AP can be determined on the basis of this variation of the current application IC/IB.

By monitoring the current gain factor IC/IB instead of the voltage potential between the LED chain LK and the current source SQn, the high-voltage-capable high-voltage terminal A4 is no longer necessary. In addition, the number of terminals of the control circuit can be reduced.

The high-voltage terminal A4 in the control circuit can be eliminated if the detection of a short circuit inside the LED chains LK is also done without tapping the voltage potential between the LED chains LK and the current sources SQn.

An LED chain LK that is at least partially short-circuited has a low voltage drop. For this reason, a larger voltage drop remains for the current source SQn. Due to this larger voltage drop between the collector and emitter of the current source SQn, the bipolar transistor heats up and can even be thermally destroyed. It is therefore necessary to shut off the relevant current source SQn if a short circuit is recognized.

One characteristic of the temperature of a bipolar transistor is its base-emitter voltage VBE. The base-emitter voltage VBE is available on the control circuit and the current source controller 1. Thus this information can be evaluated inside the control circuit in order to monitor the temperature of the bipolar transistor and thus a possible overheating and possible short circuit.

With an ambient temperature of e.g. 80° C. and a maximum junction temperature of 150° C. for the bipolar transistor, there is a convenient range for detecting an overheating of the bipolar transistor.

With a normal power loss of 300 mW for a bipolar transistor, the junction temperature of the bipolar transistor is approximately 10 to 30 K higher than the ambient temperature. This is crucially influenced by the thermal resistance of the bipolar transistor housing. At an ambient temperature of 85° C., this yields a maximum junction temperature of approximately 115° C. in normal operation.

Figure 6:
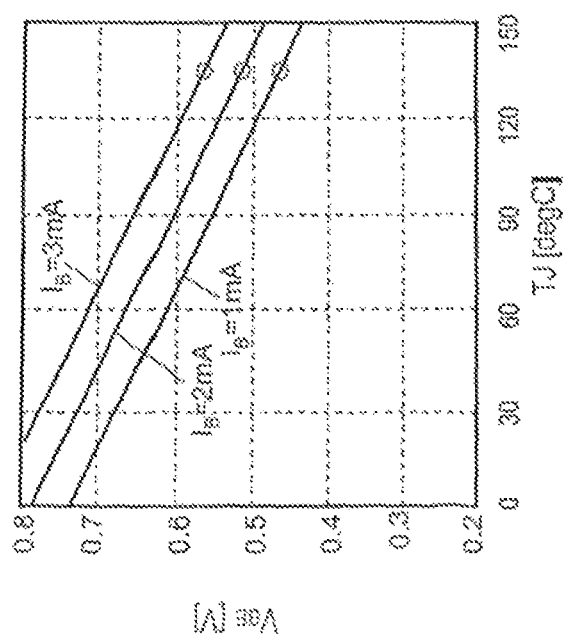
FIG. 6 shows additional example characteristic curves of a bipolar transistor.

FIG. 6 shows characteristic curves of a bipolar transistor in which the base-emitter voltage VBE for different constant values of the base current IB is plotted versus the junction temperature. For a change of the base-emitter voltage VBE by 2 mV/K and a temperature range from 115° C., for the maximum junction temperature in normal operation, up to 150° C. as the maximum possible junction temperature, this yields a voltage range of approximately 70 mV for the base-emitter voltage VBE in which a short circuit can be detected.

As can be seen from FIG. 6, the base-emitter voltage VBE is dependent on the value of the base current IB. This means that the threshold value to which the actual base-emitter voltage VBE is compared must be adapted accordingly to the existing base current IB.

This threshold value can be determined in various manners. Thus, the threshold value can be defined as a constant factor in the circuit design. Alternatively, it can be adjusted in a digital or analog manner, e.g. via a digital serial interface or also an external adjustable resistor. Another possibility is to derive the threshold value from the mean value of the base-emitter voltages VBE of all the current sources. If one assumes that the majority of the LED chains LK do not have a short circuit, then the majority of the current source transistors have a regular value of the base-emitter voltage VBE. Thus, the threshold value can be derived from the mean value of all base-emitter voltages VBE. For example, if a bipolar transistor has a base-emitter voltage VBE more than 50 mV below the mean value of the base-emitter voltages VBE, the current source SQn and therefore the corresponding LED chain LK must be shut off.

This mechanism covers not only short circuits inside the LED chains LK but also all other overheating scenarios in general. Thereby the safety of the system is also increased.

If this method is used for short-circuit recognition and the previously described DC/DC regulation, the high-voltage terminal A4 and therefore also the special high-voltage circuit 14 are no longer necessary. The number of terminals for the control circuit can be reduced. This also lowers the production costs for the control circuit. The overall system becomes more robust by forgoing the high-voltage terminal A4, because high-voltage terminals are critical for ESD protection.

Figure 7:
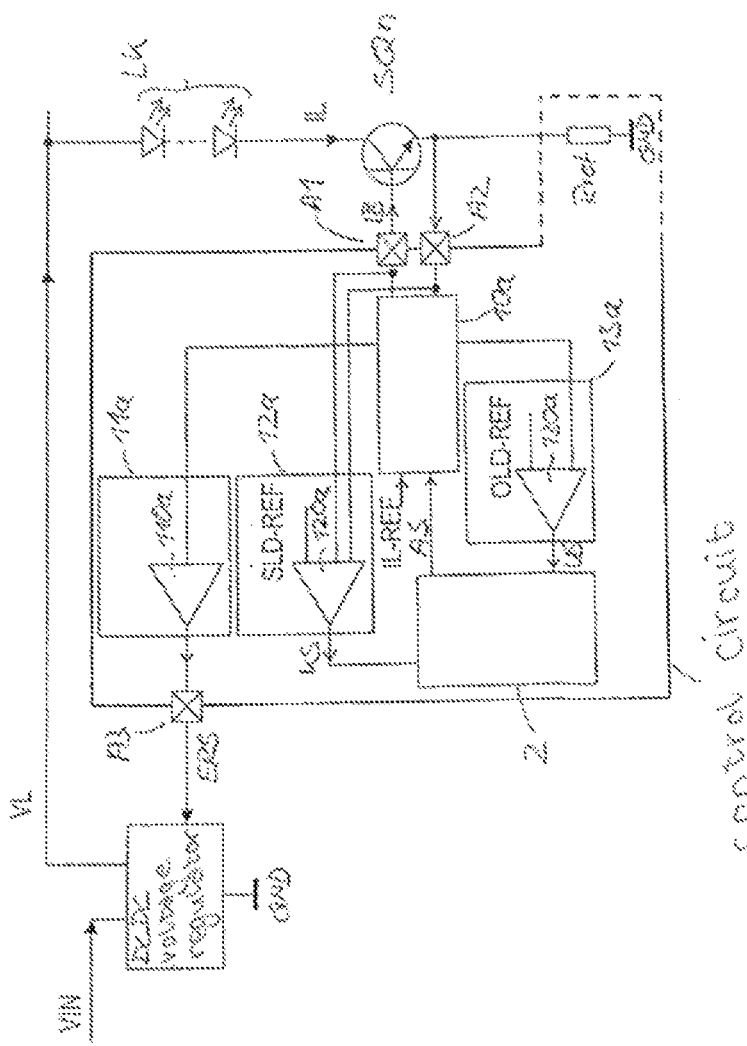
FIG. 7 shows an overview diagram of a circuit arrangement for controlling a current source coupled to a load.
Figure 6:
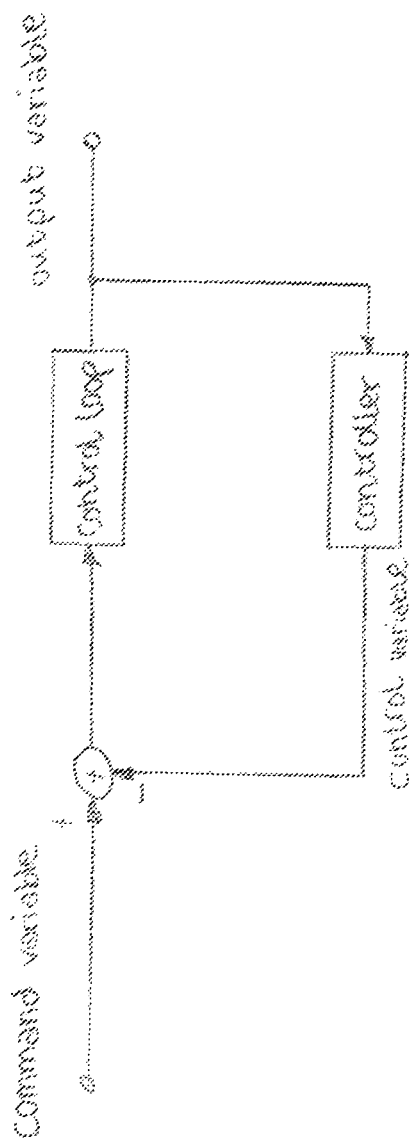

FIG. 7 shows another embodiment of a circuit arrangement for controlling a current source coupled to a load LK, in which the above-mentioned principles regarding DC/DC regulation and short-circuit detection are implemented. FIG. 7 shows a control circuit that comprises a control terminal A1 and a load reference terminal A2. The control circuit is coupled via the control terminal A1 and the control terminal A2 to the current source SQn. In this embodiment, the current source SQn comprises a bipolar transistor.

The current source SQn can alternatively be implemented as a field-effect transistor.

The control terminal A1 is connected to the base of the bipolar transistor SQn. The emitter of the bipolar transistor SQn is connected to the load reference terminal A2. A reference resistor Rref, which is connected to a reference potential terminal GND and the emitter of the bipolar transistor SQn, can be located either inside the control circuit or externally. The collector of the bipolar transistor SQn is coupled to an LED chain LK, which comprises several LEDs. The control circuit further comprises a feedback terminal A3, which is coupled to a DC/DC voltage regulator. The DC/DC voltage regulator is connected to the reference potential terminal GND and has an input for feeding an input voltage VIN. At its output, the DC/DC voltage regulator provides a load voltage VL, which is fed to the LED chain LK.

The control circuit further comprises a load current regulator 10a, a monitoring device 11a, a short-circuit detector 12a, an interruption detector 13a and a channel controller 2. The load current regulator 10a is connected at one input to the load reference terminal A2 and compares a signal that is provided at the load reference terminal A2 to a first reference signal IF-REF, and depending on the latter, provides a control signal IB, which is coupled to the control terminal A1.

Together with the current source SQn, the load current regulator 10a forms a first control loop for regulating the control signal IB. FIG. 8 illustrates a general structure of a control loop. FIG. 8 shows a control path that provides an output variable at an output. This output variable value is supplied to a regulator that provides a control variable at its output. This control variable is compared to the command variable and in turn fed to the control path. Thus, a stable output variable results at the output of the control path.

In FIG. 7, an output value of the first control loop corresponds to the control signal IB. A load current IL that flows through the LED chain LK, or a variable derived from the load current IL, i.e. the voltage that drops at the reference resistor Rref, represents a control variable of the first control loop. The reference signal IL-REF is a command variable of the first control loop. A stable control signal IB and thus a stable load current IL is adjusted by this first control loop.

The monitoring device 11a comprises a comparator 110a, which is connected on the input side to the load current regulator 10a. The comparator 110a compares the control signal IB or a variable derived from the control signal IB to the load current IL or a variable derived from the load current IL, and provides, at an output coupled to the feedback terminal A3, an external feedback signal ERS, which is routed to the DC/DC voltage regulator. The DC/DC voltage regulator converts the input voltage VIN into the load voltage VL on the basis of the external feedback signal ERS. The load voltage VL drops at the LED chain LK, the current source SQn and the reference resistor Rref.

Together with the DC/DC voltage regulator, the LED chain LK and the current source SQn, the monitoring device 11a forms a second control loop. The load voltage VL constitutes an output variable of the second control loop. The load current IL or the variable derived from the load current IL corresponds to a control variable of the second control loop. The control signal IB or the variable derived from the control signal IB is a reference value of the second control loop. A stable load voltage VL is adjusted by the second control loop based on the control signal IB or the variable derived from the control signal IB.

The short circuit detector 12a is connected on the input side to the base and the emitter of the current source SQn. It further comprises a comparator 120a, which compares the base-emitter voltage VBE of the current source SQn to a third reference signal SLD-REF, and based thereon provides a short circuit signal KS at an output. This short circuit signal KS is fed to the channel controller 2, which then provides an activation signal AS at an output. This activation signal AS, which is routed to the load current regulator 10a, can activate or deactivate the latter. For example, if there is a short circuit inside the LED chain LK, the collector-emitter voltage VCE at the current source SQn rises and therefore increases the junction temperature of the transistor. As a result of the temperature increase of the junction, the base-emitter voltage VBE of the bipolar transistor SQn declines. If this base-emitter voltage VBE falls below a threshold value specified by the reference signal SLD-REF, the comparator 120a outputs a short-circuit signal KS. At its output, the channel controller 2 outputs a signal AS for deactivating the load current regulator 10a. Thereby the current source SQn is shut off and a thermal destruction of the bipolar transistor SQn is prevented.

The interruption detector 13a is coupled on the input side to the load current regulator 10a. The interruption detector 13a comprises a comparator 130a, which compares the control signal IB to an interruption reference signal OLD-REF and provides an interruption signal US on the basis thereof. This interruption signal US is routed for further evaluation to the channel controller 2. As a result of this evaluation, the channel control 2 provides the activation signal AS at its output, which is routed to the load current regulator 10a. If there is an interruption inside the LED chain LK, no load current IL is flowing. As a result, there is a very low voltage drop at the resistor Rref. The load current regulator 10a then continually increases the control signal IB with the goal of raising the voltage drop at the resistor Rref by means of the collector-emitter voltage VCE of the bipolar transistor SQn. If the control signal IB reaches the threshold value that is defined by the interruption reference signal OLD-REF, then the interruption detector 13a emits the interruption signal US at its output. The channel controller 2 then deactivates the load current regulator 10a and thus the current source SQn. This prevents the control signal 1b from being increased to impermissible values for the bipolar transistor SQn.

In an alternative embodiment, not shown, an interruption can also be detected by monitoring the emitter voltage of the bipolar transistor SQn.

Figure 9:
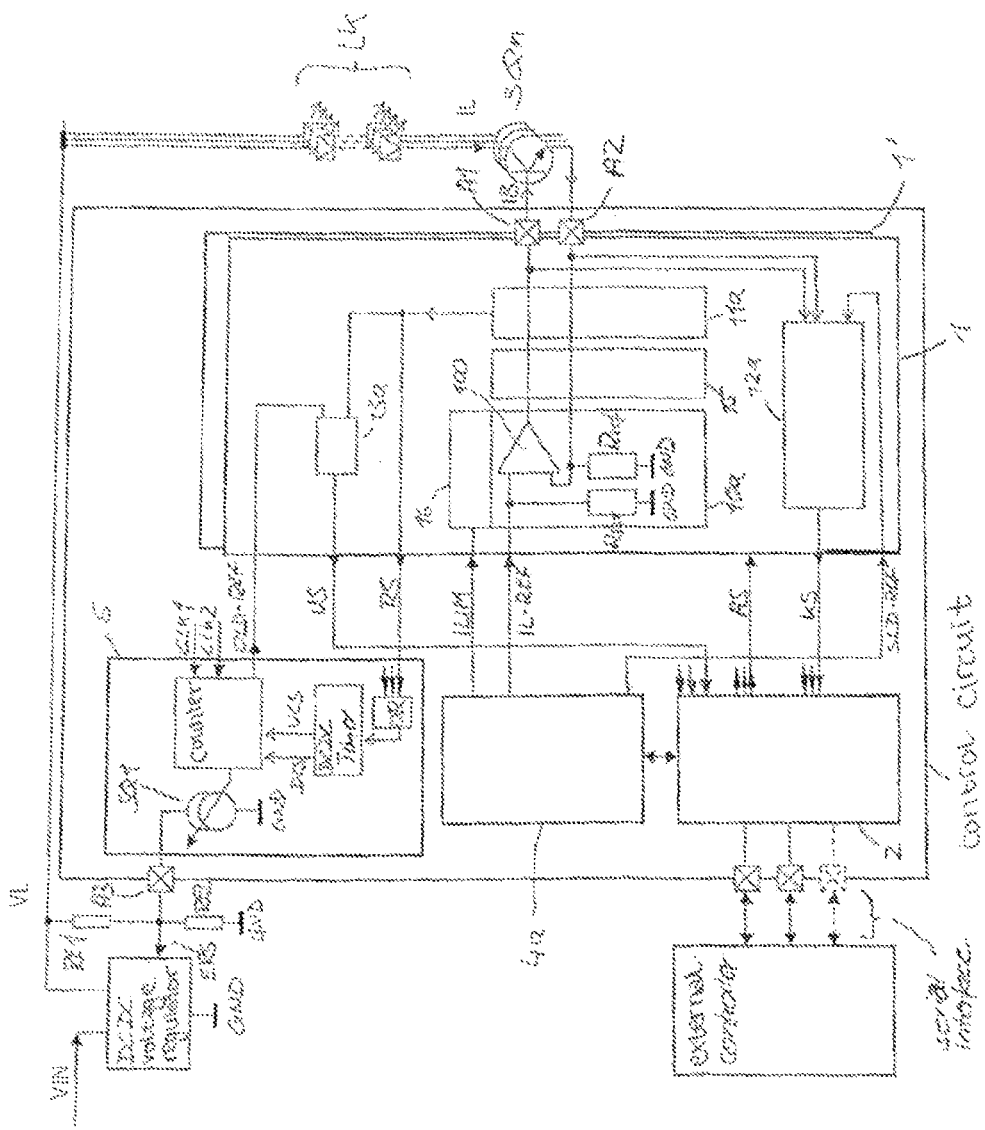
FIG. 9 shows another overview diagram of a circuit arrangement for controlling a current source coupled to a load.

FIG. 9 shows another overview diagram of a circuit arrangement for controlling current sources SQn coupled to LED chains LK. FIG. 9 clarifies the principles that are shown in FIG. 7.

The control circuit comprises several current source controllers 1, 1'. One current source controller 1, 1' is assigned to each current source SQn and is coupled to it via a control terminal A1 and a load reference terminal A2.

The control circuit further comprises a channel controller 2, a reference circuit 4a and a signal converter 5.

The current source controller 1, 1' comprises a load current regulator 10a, a monitoring device 11a, a short-circuit detector 12a, an interruption detector 13a, a compensation circuit 15 and a control signal limiting circuit 16.

The load current regulator 10a is designed to provide a control signal IB for controlling the current source SQn at an output coupled to the control terminal A1.

FIGS. 10A-10E illustrate various possibilities for the construction of a controlled current source.

FIG. 10A shows the structure of a current source with two MOS field-effect transistors TS1 and TS2 (MOSFETs). The source of the transistor TS1 and the source of the transistor TS2 are directly coupled to a reference potential terminal GND. The gate and drain terminals of the transistor TS2 are coupled to the gate terminal of the transistor TS1 and an input terminal for feeding a reference current IR. A load current IL flows at the drain terminal of the transistor TS1. The ratio of the load current IL to the reference current IR is determined solely by the properties of the transistors TS1 and TS2. If the transistors TS1 and TS2 have the same properties, the reference current IR corresponds to the load current IL.

FIG. 10B shows a structure of a current source similar to that of FIG. 10A. In contrast to FIG. 10A, the source of the transistor TS2 is connected via a resistor R1 to the reference potential terminal GND. Equivalently, the source of the transistor TS1 is coupled to the reference potential terminal GND via a resistor R2. In this embodiment, the ratio of the load current IL to the reference current IR is determined by the properties of the transistors TS1 and TS2 and by the ratio of the resistances of R1 and R2. In an embodiment, not shown, the transistors TS1 and TS2 can also be realized as bipolar transistors, for which the resisters R1 and R2 are coupled to the respective emitter terminals.

Another possibility for a structure of a current source is shown in FIG. 10 with a cascode circuit, in which a source and a gate circuit are connected in series. The cascode circuit is constructed from the transistors TS1, TS2, TS3 and TS4.

A more precise adjustment of the load current IL can be achieved via an active regulation of the transistor TS1 with the aid of an operational amplifier OP. The operational amplifier OP is connected on the input side to the resistor R1 and the resistor R2, which are in turn connected to the reference potential terminal GND. A first voltage drop is produced at the resistor R1 by the reference current IR. A second voltage drops at the resistor R2 due to the load current IL. The operational amplifier OP, which is coupled to the gate of the transistor TS1, compares the first voltage drop at the resistor R1 to the second voltage drop at the resistor R2 and regulates the gate of the transistor TS1 based on the comparison until a balance is reached. The ratio of the load current IL to the reference current IR thus corresponds to the ratio of the resistor R1 to the resistor R2.

Figure 10E:
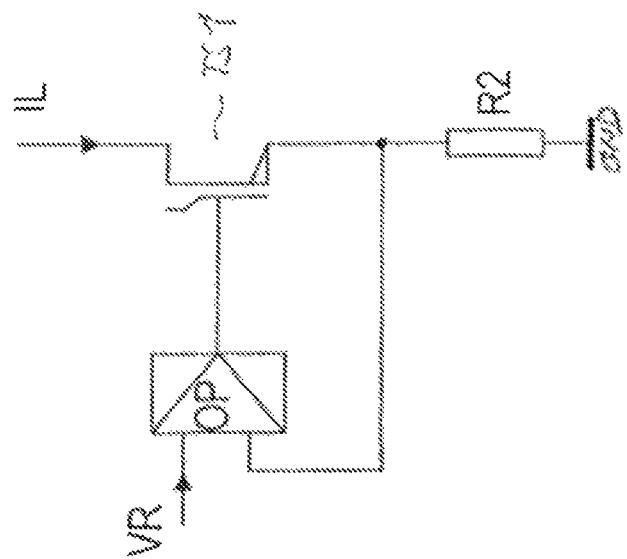
FIG. 10 shows embodiment examples of a current source.
Figure 10D:
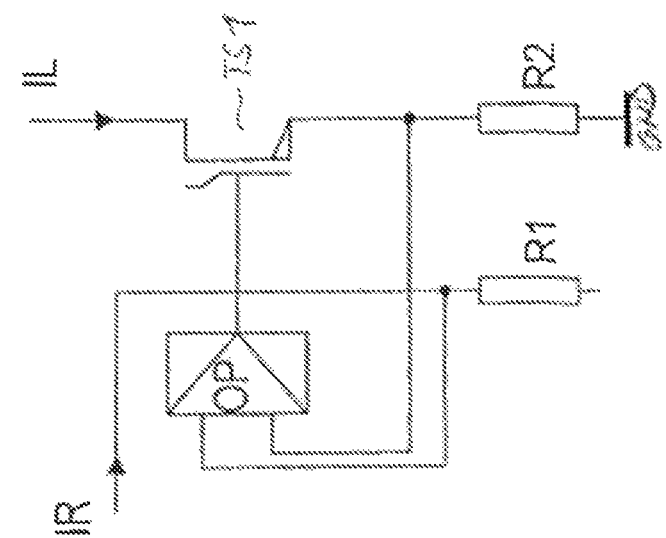

FIG. 10E shows another alternative for the active regulation of a current source. In this embodiment, the operational amplifier OP compares a reference voltage VR to a voltage that is generated by the load current IL at the resistor R2. The operational amplifier OP regulates the gate of the transistor TS1 until the voltage at the resistor R2 corresponds to the reference voltage VR.

In the load current regulator 10a, FIG. 9 illustrates a variant of the active regulation of the current source SQn. For this purpose, the load current regulator 10a comprises an operational amplifier 100, which is coupled at a first input to the reference circuit 4a and a resistor Rlsr, and to the load reference terminal A2 and a reference resistor Rref at a second input. The resistors Rlsr and Rref are in turn connected to a reference potential terminal GND. A first reference signal IL-REF is provided by the reference circuit 4a and is fed to the first input of the K operational amplifier 100. In this embodiment, the first reference signal IL-REF corresponds to a current that generates a first voltage at the resistor Rlsr. A load current IL generates a second voltage in the reference resistor Rref. The operational amplifier 100 compares these two voltages and provides a control signal IB in the form of a control current IB for regulating the current source SQn at its output, which is connected to the control terminal A1. Thereby the control current IB, and thus also the load current IL through the LED chains LK, is controlled by the load current regulator 10a on the basis of the first reference signal IL-REF.

The monitoring device 11a is coupled on the input side to the output of the load current regulator 10a and to one of the inputs of the load current regulator 10a. The monitoring device 11a compares the control signal IB or a variable derived from the control signal IB to the load current IL or to a variable derived from the load current IL. Depending on this comparison, the monitoring device 11a provides a feedback signal RS at an output which is coupled to the signal converter 5.

The signal converter 5 is coupled to a feedback terminal A3 of the control circuit and comprises an OR gate, a DC/DC timer, a counter and a current source SQ1. On the input side, the OR gate is connected to all current source controllers 1, 1', in order to pick up the feedback signal RS. The output of the OR gate is connected to the DC/DC timer, which monitors whether the signal level of the OR gate is stable over an adjustable time period. This is necessary in order to be able to transmit reliable information to the counter. Based on the feedback signal RS, the DC/DC timer passes on a count signal UCS, DCS for incrementation or decrementation to the counter. The speed of the counter's counting/cycling can be configured via the clock signals CLK1 and CLK2. In this embodiment, incrementation takes place with a faster cycle time than decrementation. If the counter receives the count signal UCS for incrementing on the input side, then it sets the current source SQ1, which is coupled to the feedback terminal A3 and one output of the counter, to a higher current value. If the counter receives the count signal DCS for decrementing, it sets the current source SQ1 to a lower current value.

The current from the current source SQ1 is routed to the feedback terminal A3 and a voltage divider comprising the resisters RE1 and RE2. The voltage drop caused by the current from the current source SQ1 at the resistor RE2, which is connected to the reference potential terminal GND, corresponds to an external feedback signal ERS that is fed to a DC/DC voltage regulator. The DC/DC voltage regulator is connected to the reference potential terminal GND and has an input for feeding an input voltage VIN. On the basis of the external feedback signal ERS, the DC/DC voltage regulator converts the input voltage VIN into a load voltage VL. The load voltage VL drops at the LED chains LK, the current sources SQn and the reference resistors Rref. This regulation has the effect that the voltage drop at the current source SQn is reduced to a minimum, while the current gain factor IL/IB still remains in an optimal operating range.

The feedback signal RS of the monitoring device 11a is also routed to the interruption detector 13a. The interruption detector 13a evaluates the feedback signal RS and an interruption reference signal OLD-REF provided by the counter of the signal converter 5, and based thereon provides an interruption signal US at an output. If the monitoring device 11a initiates, with the aid of the feedback signal RS, an incrementation of the counter in the signal converter 5, but the counter signals via the interruption reference signal OLD-REF that the maximum current value for the current source SQ1 has already been reached, then the interruption detector 13a detects an interruption inside the LED chains LK. This is signaled via the interruption signal US to the channel controller 2. Based on the interruption signal US, the channel controller 2 provides an activation signal AS at an output that is connected to the load current regulator 10a. The load current regulator 10a is deactivated by the activation signal AS when an interruption is detected inside the corresponding LED chain LK. Alternatively, the feedback signal RS of the affected channel can be decoupled from the DC/DC control loop.

The control signal limiting circuit 16 is connected on the input side to the reference circuit 4a, and on the output side to the load current regulator 10a. The reference circuit 4a provides a current signal limiting current ILIM at an output that is connected to the current signal limiting circuit 16. The current signal limiting circuit 16 ensures that the load current regulator 10a does not raise the control signal IB to values that are impermissible for the current sources SQn.

The short-circuit detector 12a is connected on the input side to the control terminal A1 and the load reference terminal A2. From the signals at the control terminal A1 and at the load reference terminal A2, the short-circuit detector 12a forms a difference signal that it compares to a third reference signal SLD-REF, which is provided by the reference circuit 4a. Based on this comparison, the short-circuit detector 12a provides a short-circuit signal KS at an output that is connected to the channel controller 2. The channel controller 2 evaluates the short-circuit signals KS of all current source controllers 1, 1' and provides the activation signal AS at its output. The load current regulator can be activated or deactivated with the aid of this activation signal AS.

If there is a short circuit inside an LED chain LK, a larger portion of the load voltage VL drops at the current source SQn. If the current source SQn comprises a bipolar transistor, then the part of the load voltage VL that drops at the current source SQn corresponds to a collector-emitter voltage VCE. If the collector-emitter voltage VCE is increased, the bipolar transistor SQn heats up for a given load current. As a consequence of the heating of the bipolar transistor SQn, the base-emitter voltage VBE, which corresponds to the difference signal between the control terminal A1 and the load reference terminal A2, decreases. This base-emitter voltage VBE of the bipolar transistor SQn is compared by the short-circuit detector 12a to the threshold value, which is defined by the third reference signal SLD-REF. If the base-emitter voltage VBE falls below this threshold value, the short circuit detector 12a outputs a short-circuit signal KS, which is routed to the channel controller 2. The channel controller 2 then sets a corresponding activation signal AS in order to deactivate the affected load current regulator 10a and thus prevent a destruction of the current source SQn.

The channel controller 2 also comprises a serial interface to an external controller. The mode of operation and the threshold values of the channel controller 2 can be influenced with the aid of this external controller. In an embodiment that is not shown, the interface to the external controller can also be a parallel interface.

The mode of operation of the current source controller and the blocks contained therein will be described in greater detail in the following figures.

Figure 11:
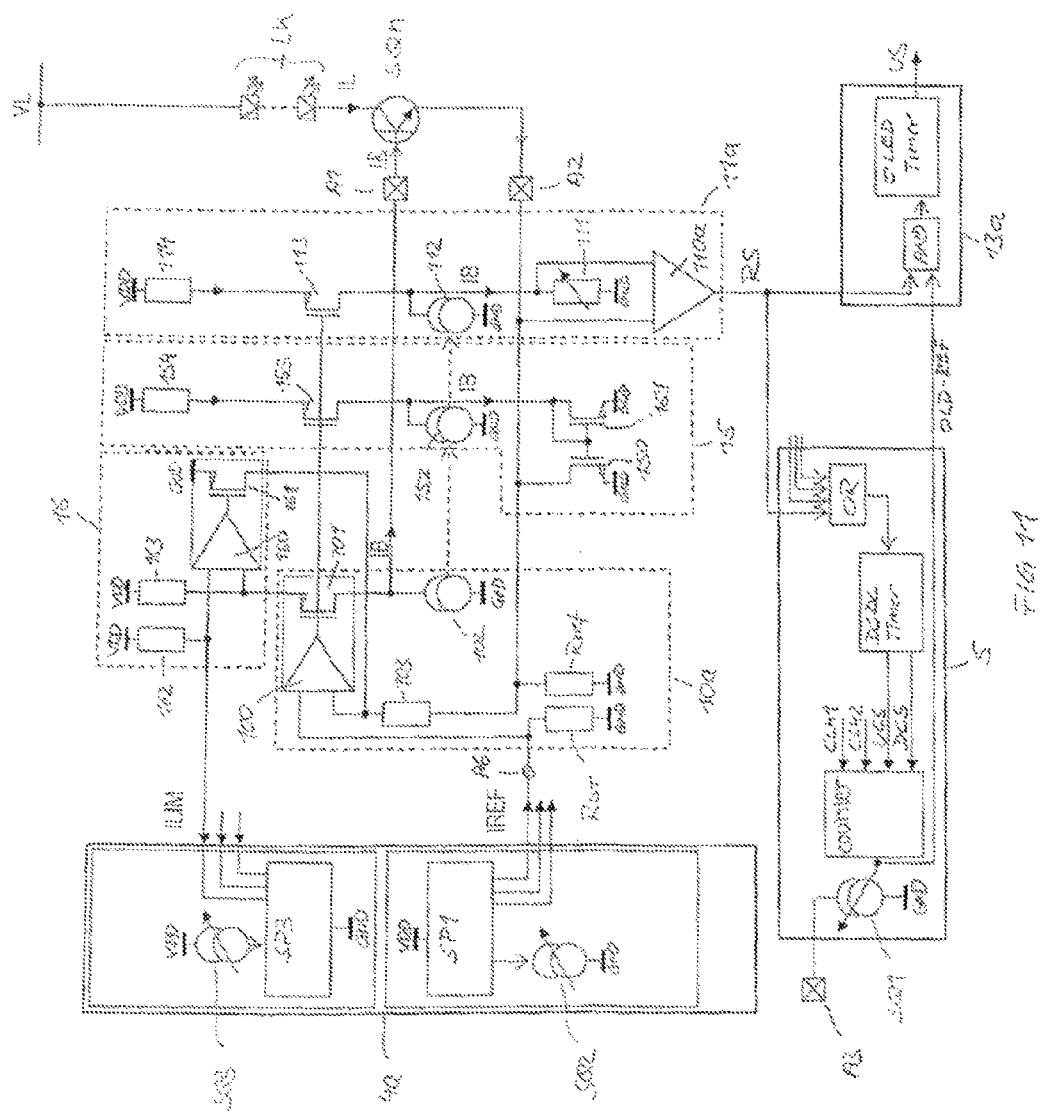
FIGS. 11-15 show detailed embodiment examples of a circuit arrangement for controlling a current source coupled to a load.

FIG. 11 shows a detailed circuit arrangement for controlling a current source SQn coupled to an LED chain LK. The circuit arrangement comprises a load current regulator 10a, a compensation circuit 15, a monitoring circuit 11a, a control signal limiting circuit 16, a reference circuit 4a, a signal converter 5 and an interruption detector 13a. The current source SQn is realized in this example as a bipolar transistor. The circuit arrangement is connected via a control terminal A1 to the base of the bipolar transistor SQn and via a load reference terminal A2 to the emitter of the bipolar transistor SQn. The LED chain LK and the bipolar transistor SQn are located outside of an integrated circuit. The remaining functional blocks are constructed on the integrated circuit.

The load current regulator 10a comprises an operational amplifier 100, a transistor 101, a current source 102, a resistor 103, a resistor Rlsr and a reference resistor Rref. A control loop for controlling a stable load current IL through the LED chain LK is formed by the operational amplifier 100, the transistor 101, the current source 102, the bipolar transistor SQn and the resistors Rlsr and Rref. The operational amplifier 100 controls the output side-coupled transistor 101 in such a manner that a control signal IB, in particular a control current IB, leading to the desired load current IL is adjusted. The operational amplifier 100 adjusts the control current IB and therefore the load current IL in such a manner that an identical voltage drop is generated at the resistor Rlsr and the reference resistor Rref. The voltage drop at the resistor Rlsr is generated by a first reference signal IREF, in particular, a first reference current IREF, which is supplied via a first reference signal terminal A6.

The voltage drop at the reference resistor Rref is generated by the load current IL. The ratio of the load current IL to the reference current IREF is determined by the ratio of the resistor Rlsr to the reference resistor Rref. Thereby the desired load current IL can be adjusted via the ratio of the resistors Rlsr and Rref.

The first reference current IREF is provided by a first reference signal source SP1 of the reference circuit 4a. The first reference signal source SP1 is coupled to a terminal for feeding a supply voltage VDD and to a current source SQ2, which is connected to a reference potential terminal GND. The first reference signal source SP1 is designed as a current mirror, which provides the first reference current IREF for all channels at an output on the basis of a current through the current signal source SQ2.

In an embodiment that is not shown, the first reference current IREF can be modified by an external resistor or the content of a register that was set by an interface command.

Without the compensation circuit 15, the current to the reference resistor Rref would correspond to an emitter current of the bipolar transistor SQn, which is formed by the sum of the base current IB and the load current IL. But because the voltage drop at the reference resistor Rref is to be caused only by the load current IL, the compensation circuit 15 subtracts the base current IB from the emitter current of the bipolar transistor SQn. For this purpose, the compensation circuit 15 comprises a current source 152, a transistor 153 and a resistor 154 that is coupled to a terminal for feeding a supply signal VDD. The base current IB, which controls the current source SQn, is emulated by these components in the compensation circuit 15. A current mirror, which comprises the transistors 150 and 151, each coupled to the reference potential terminal GND, subtracts the base current IB from the emitter current of the bipolar transistor SQn. The compensation circuit 15 leads to a more exact adjustment of the load current IL.

The control signal limiting circuit 16 defines the maximum control current IB that is supplied to base of the bipolar transistor SQn. The control signal limiting circuit 16 comprises an operational amplifier 160, a transistor 161 and the resistors 162, 163. If the LED chain LK is electrically interrupted, no load current IL flows. In this case, the load current regulator 10a would attempt to increase the base current IB until a suitable load current has been adjusted. The load current regulator 10a would raise the base current IB to levels that are impermissible for the bipolar transistor SQn. In order to avoid this, the control signal limiting circuit 16 limits the control current IB to a maximum value that is determined by a control signal limiting current ILIM and the ratio of the resistors 162 and 163.

A first voltage drop is caused at the resistor 162 by the control signal limiting current ILIM. The control current IB flows through the resistor 163 and leads to a second voltage drop. The operational amplifier 160 compares these two voltages and, based on this comparison, controls the transistor 161, which in turn influences the operational amplifier 100 of the load current regulator 10a. Thus the ratio of the control signal limiting current to a maximum control current IB is determined by the ratio of the resistors 163 and 162. The control signal limiting current ILIM is provided by a current mirror SP3 of the reference circuit 4a. The current mirror SP3 provides the current signal limiting current ILIM on the basis of a current from a current source SQ3 for all channels electrically coupled to the current mirror SP3.

In an embodiment that is not shown, the control signal limiting current ILIM is determined by an external resistor or a register content that was set by an interface command.

The parallel arrows pointing to the control signal limiting current ILIM and the first reference signal IREF in FIG. 11 are only intended to indicate that the reference circuit 4a can be used for controlling additional current sources SQn.

The monitoring device 11a comprises a current source 112, a transistor 113 and a resistor 114, which is connected to a terminal for feeding the supply voltage VDD. The control current IB is emulated in the monitoring device 11a by these components. The monitoring device 11a further comprises a comparator 110a and an adjustable resistor 111, which is coupled to the reference potential terminal GND. The comparator 110a compares a voltage drop caused at the resistor 111 by the emulated control current IB to an additional voltage drop, which the load current IL causes in the reference resistor Rref. On the basis of this comparison, the comparator 110a provides a feedback signal RS at its output, which is routed to the signal converter 5 and the interruption detector 13a.

A defined comparison limit of the current gain factor in the current source SQn can be adjusted by the ratio of the resistor 111 and the reference resistor Rref. If the value of the collector-emitter voltage VCE of the bipolar transistor SQn is lowered, then the current gain factor of the bipolar transistor SQn, which is characterized by the ratio of the load current IL to the control current IB, also decreases to lower values. If the current gain factor of the bipolar transistor SQn falls below a level defined by the resistors 111 and Rref, then via the feedback signal RS, the comparator 110a brings about an incrementation of the counter constructed in the signal converter 5. Incrementation of the counter causes an increase of the output current from the current source SQ1, which is coupled on the output side to a feedback terminal A3. The feedback terminal A3 is in turn coupled to a DC/DC voltage regulator, not shown in FIG. 11. Due to the increased output current of the current source SQ1, the DC/DC voltage regulator provides a higher load voltage VL. With the increased load current VL, a larger collector-emitter voltage VCE drops at the bipolar transistor. Therefore the current gain factor rises above a threshold value that is monitored by the monitoring device 11a. By means of this control loop, the collector-emitter voltage VCE at the bipolar transistor SQn is set to a minimum value, at which the current source SQn is still in an optimal operating range. The regulation additionally has the objective of minimizing the power loss in the bipolar transistor SQn and of providing a defined load current IL that is necessary for the operation of the LED chain LK.

The resistor 111, which is relevant to changing the comparison limit for the current gain factor, can be adjusted by means of the content of a register that can be written via an interface command.

An interruption inside the LED chain LK is determined by the interruption detector 13a. For this purpose, the feedback signal RS of the monitoring device 11a and an interruption reference signal OLD-REF are supplied to the interruption detector 13a. The interruption reference signal OLD-REF is provided by the signal converter 5. The interruption reference signal OLD-REF is generated if the current source SQ1 has already reached a maximum output current value. An AND gate of the interruption detector 13a links the interruption reference signal OLD-REF to the feedback signal RS on the input side. To summarize, an interruption inside the LED chain LK is detected in case a maximum value of the output current of the current source SQ1 is reached and the feedback signal initiates a further incrementation of the counter. On the output side, the AND gate is connected to an OLED timer, which is designed to filter out short-term signal fluctuations inside a circuit arrangement. Therefore, a reliable interruption signal US is provided at an output of the OLED timer. The interruption signal US is routed to a channel controller 2, not shown, which then influences the load current regulator 10a.

Figure 12:
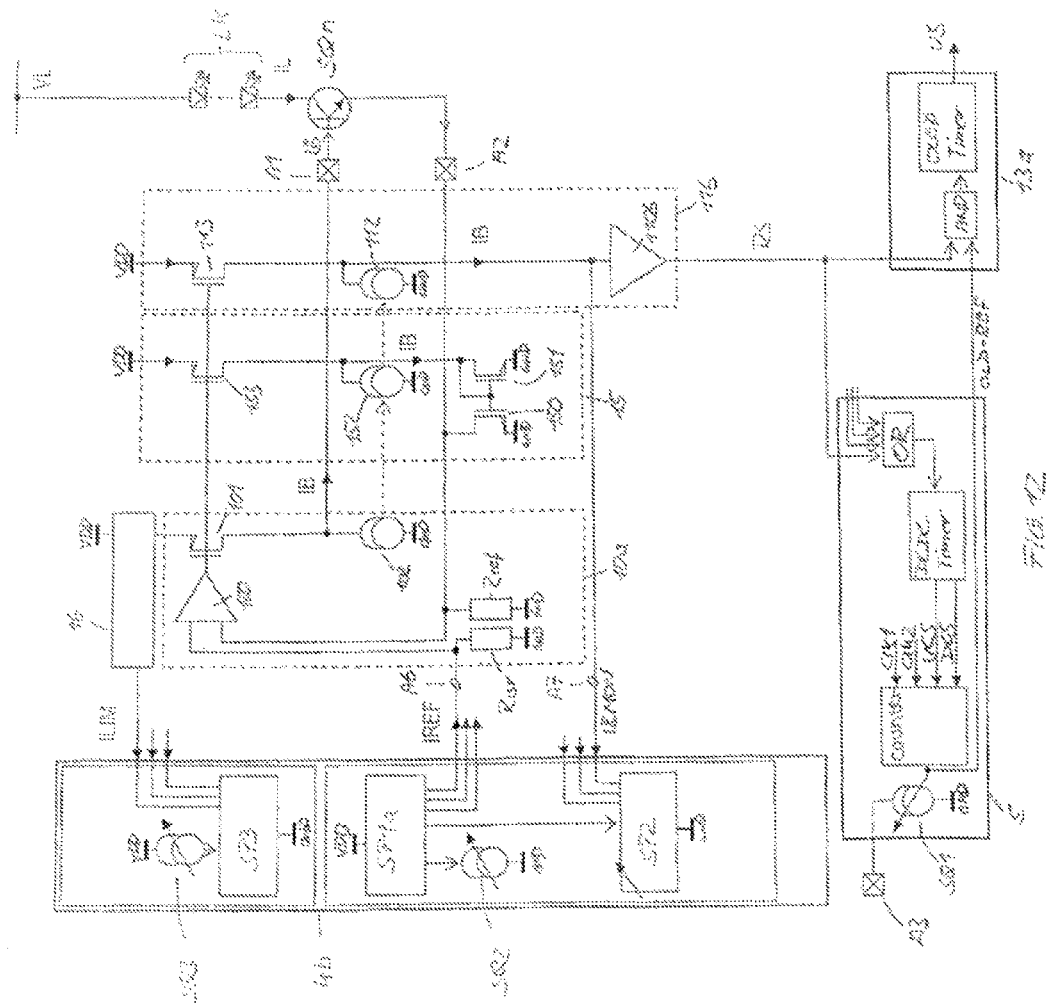

FIG. 12 shows another embodiment of a circuit arrangement for controlling a current source SQn coupled to an LED chain LK. The current source is implemented as an NPN bipolar transistor. The circuit arrangement comprises a control terminal A1, to which the base of the NPN bipolar transistor SQn is coupled, and a load reference terminal A2 that is connected to the emitter of the NPN bipolar transistor SQn. The circuit arrangement further comprises a load current regulator 10a, a compensation circuit 15, a monitoring device 11b, a control signal limiting unit 16 and an interruption detector 13a.

The load current regulator 10a comprises a K operation amplifier 100, a transistor 101, a current source 102 and resistors Rlsr and Rref. A first reference signal IREF, in particular a first reference current IREF, is supplied at a first reference signal terminal A6 to the load current regulator 10a. The first reference current IREF leads to a first voltage drop at the resistor Rlsr. A load current IL, which flows through the LED chain LK and the reference resistor Rref, causes a second voltage drop at the reference resistor Rref. The operational amplifier 100 compares the first and second voltage drops and controls the transistor 101 coupled to an output of the operational amplifier 100 in such a manner that a control current IB is provided, which is used to control the current source SQn. The ratio of the load current IL to the first reference current IREF corresponds to the ratio of the resistor Rlsr to the reference resistor Rref.

The compensation circuit 15 subtracts the base current IB from the emitter current of the NPN bipolar transistor SQn. Because of this subtraction, only the load current IL flows through the reference resistor Rref. This in turn makes it possible for the load current regulator 10a to adjust the control current IB on the basis of the load current IL.

The monitoring device 11b comprises a comparator 110b, a current source 112 and a transistor 113. The comparator 110b is designed to subtract currents from one another and evaluate a difference current. Thus, the comparator 110b operates in the current domain, in contrast to the comparator 110a of FIG. 11, which operates in the voltage domain. The control current IB is emulated in the monitoring device 11b with the aid of the transistor 113, which is connected to a terminal for feeding a supply voltage VDD, and the current source 112. The comparator 110b compares the emulated control current IB to a second reference signal IBMON, in particular a second reference current IBMON. Based on this comparison, the comparator 110b provides a feedback signal RS at an output. The second reference current IBMON is fed to the monitoring device 11b by a reference circuit 4b via a second reference signal terminal A7. The second reference current IBMON is provided by a second reference signal source SP2 of the reference circuit 4b. The second reference signal source SP2 is constructed as a current mirror and is coupled to a first reference signal source SP1a of the reference circuit 4b and a reference potential terminal GND. Due to the coupling with the first reference signal source SP1a, which provides the first reference current IREF, the second reference current IBMON is produced on the basis of the first reference current IREF. Thus, the second reference current IBMON is linked into the control loop for providing the load current IL, and its value is dependent on the load current IL. Consequently, the comparator 110b compares the control current IB to a variable derived from the load current IL.

The feedback signal RS is routed to a signal converter 5, which provides an external feedback signal ERS at an output coupled to the feedback terminal A3. The external feedback signal ERS is processed by a DC/DC voltage regulator, not shown, which then provides a load voltage VL, which drops across the LED chain LK, the NPN bipolar transistor SQn and the reference resistor Rref. The current gain factor, which is defined by the ratio of the load current IL to the control current IB, is compared by the monitoring device 11b to a limit. This limit can be modified by varying the value of the second reference signal source SP2. This makes it possible to adjust the current gain factor for all LED chains LK centrally in the reference circuit 4b. In the circuit arrangement of FIG. 11, it is necessary to determine the current gain factor individually for each LED chain LK by the adjustable resistor 111.

The mode of operation of the circuit arrangement will be explained further with an example. For a desired load current IL of 100 mA and a resistance ratio of 100 between Rlsr and Rref, the first reference current IREF must be set to a value of 1 mA. With a minimum current gain factor of 100 for the current source SQn, the threshold at which the load voltage VL is corrected upward by the monitoring device 11b and the signal converter 5 can be set to a value of 80. If the momentary current gain factor drops to a value of 80 with a load current of 100 mA, then the control current IB is 1.25 mA. This in turn means that the variable second reference current IBMON of the second reference signal source SP2 must likewise be adjusted to a value of 1.25 mA. This is achieved by setting a factor of 1.25, because the second reference current IBMON is set as a function of the first reference current IREF. As a result of the settings, the feedback signal RS for increasing the load voltage VL is generated if the current gain factor falls below a value of 80.

The feedback signal RS is also routed to the interruption detector 13a for detecting an interruption inside the LED chain LK. The interruption detector 13a then provides an interruption signal US. The control signal limiting circuit 16 prevents the control current IB from being raised to impermissible values that could destroy the NPN bipolar transistor SQn in case there is an interruption inside the LED chain LK.

Figure 13:
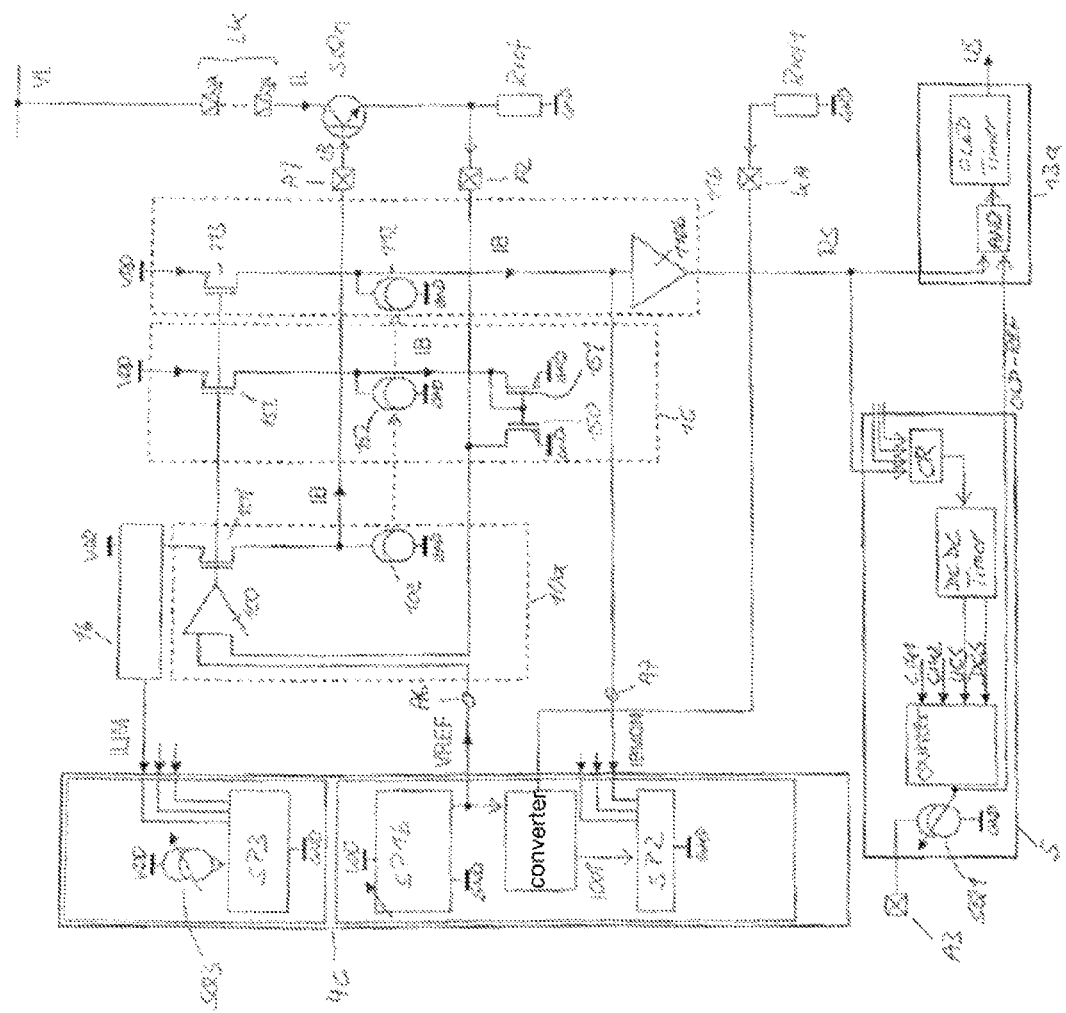

FIG. 13 shows another embodiment of a circuit arrangement for controlling a current source SQn coupled to a load LK. The circuit arrangement comprises a load current regulator 10a, a compensation circuit 15, a monitoring device 11b, a control signal limiting unit 16 and an interruption detector 13a. The functional blocks just mentioned are each implemented once for each LED chain LK or current source SQn.

The circuit arrangement further comprises a reference circuit 4c and a signal converter 5. These two units are only implemented once for all LED chains LK or all current sources SQn, and thus take on a central function. Arrows arranged in parallel pointing to the signal inputs of these two components are intended to illustrate that signals of the drive modules for other LED chains LK or current sources SQn can also be evaluated.

The load current regulator 10a comprises an operational amplifier 100, a transistor 101 and a current source 102. A first input of the operational amplifier 100 is connected via a first reference signal terminal A6 to a first reference signal source SP1b of the reference circuit 4c. At the first reference signal terminal A6, the first reference signal source SP1b provides a first reference signal VREF, in particular a first reference voltage VREF. A second input of the operational amplifier 100 is coupled to a load reference terminal A2, which is in turn connected to the emitter of the bipolar transistor SQn and to a reference resistor Rref. A load current IL corresponding to the load current IL flowing through the LED chain LK flows through the reference resistor Rref. The voltage drop this causes at the reference resistor Rref is compared by the operational amplifier 100 to the first reference voltage VREF. On the basis of the comparison, the operational amplifier 100 controls the transistor 101 coupled to one output in order to provide a control current IB. The control current IB is routed to a control terminal A1, which is coupled to the base of the bipolar transistor SQn. Because the first reference signal VREF is configured as a first reference voltage VREF, it is possible to do without the resistor Rlsr, unlike in FIG. 12. Consequently, the reference resistor Rref can also be arranged outside the load current regulator 10a and outside the integrated circuit. The load current IL is controlled on the basis of the relation of the resistor Rref to the first reference voltage VREF.

The compensation circuit 15 subtracts the control current IB from the emitter current of the bipolar transistor SQn. For this reason, only the load current IL flows through the reference resistor Rref.

The monitoring device 11b corresponds to the monitoring device 11b from FIG. 12. The second reference current IBMON is provided at the reference signal terminal A7 by a second reference signal source SP2. As in FIG. 12, the second reference signal source SP2 provides the second reference current IBMON based on the first reference signal. Because the first reference signal VREF in FIG. 13 is a first reference voltage, however, and not a first reference current IREF, the first reference current VREF must first be converted into a current OUT by a voltage-to-current converter. The conversion ratio of the converter is influenced by a central reference resistor Rref1, which is coupled via a converter terminal KA to the converter. The current gain factor monitored by the comparator 110b is determined by the ratio of the reference resistors Rref1 to Rref.

The following example will further clarify the dimensioning of the reference resistors Rref and Rref1. For a desired load current of 100 mA and a reference resistance Rref of 5Ω, the first reference voltage VREF of the first reference signal source SP1b must be set to a value of 500 mV. With a minimum current gain factor of 100 for the current source SQn, the threshold for the current gain factor at which the monitoring device 11b initiates an increase of the load voltage VL can be set to the value of 80, for example. The load voltage VL in this case is the voltage that drops across the LED chain LK, the current source SQn and the reference resistor Rref. If the current gain factor of the bipolar transistor SQn drops to a value of 80, this implies a control current IB of 1.25 mA for a load current IL of 100 mA. Therefore, the second reference current IBMON must also be set to a value of 1.25 mA. The value of the reference resistor Rref1 can be determined from these figures. It follows from the value of 500 mV for the reference voltage VREF divided by the desired current value of 1.25 mA. This yields a resistance value of 400Ω for the reference resistor Rref1. With such a dimensioning of the resistances Rref and Rref1, the comparator 110*b* provides the feedback signal RS for raising the load voltage VL at its output if the current gain factor falls below a value of 80.

Figure 14:
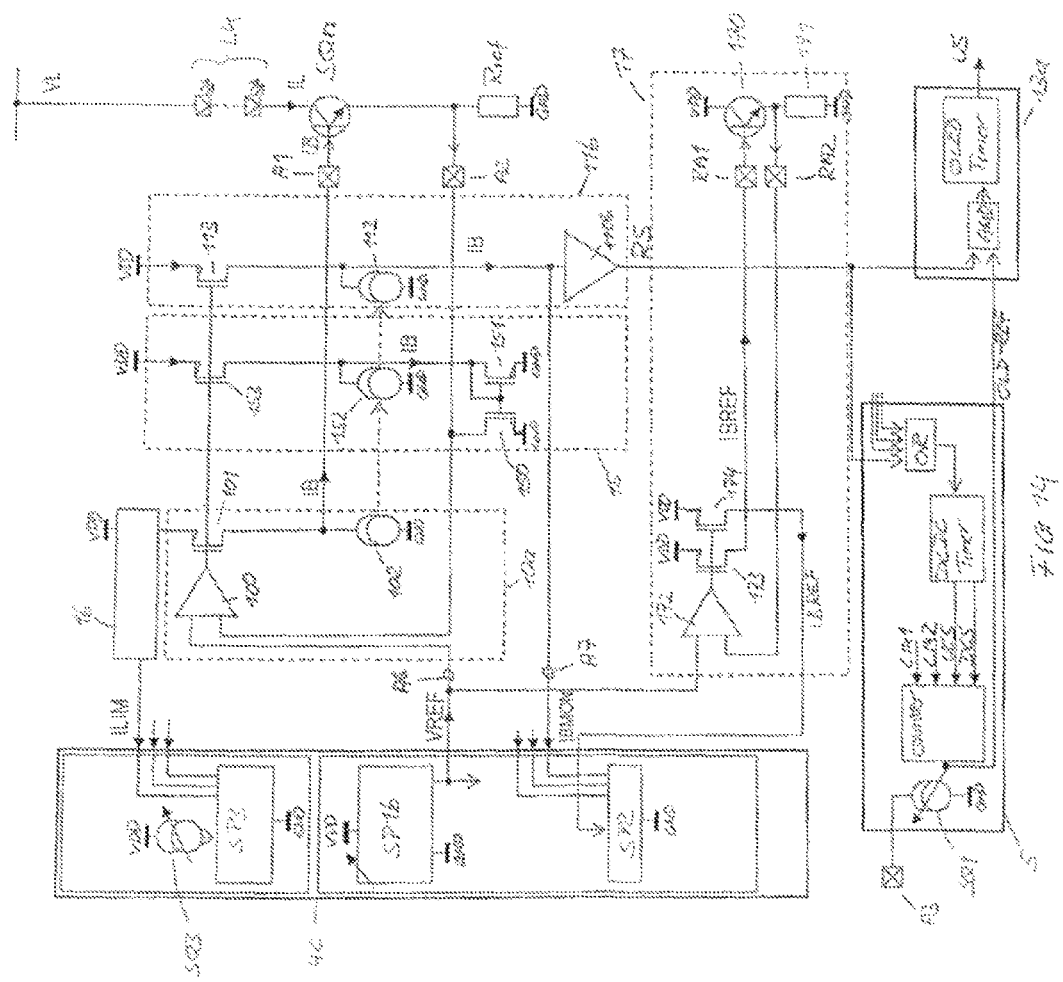

The circuit arrangement from FIG. 14 shows another embodiment for the controller of a current source SQn that is coupled to an LED chain LK. The circuit arrangement substantially corresponds to the circuit arrangement from FIG. 13. It merely shows an additional variant for creating a threshold value of the current gain factor, which is adjusted by the monitoring circuit 11*b*. In the circuit arrangements from FIGS. 11 and 12, this threshold value is either permanently set (e.g. by the circuit design in the form of specially dimensioned resistors) or can be set to a desired value via an external digital interface. In FIG. 13, the current gain factor is determined via a ratio of the external reference resistances Rref and Rref1.

This arrangement from FIG. 14 comprises an additional circuit 17 in order to emulate the current gain factor under normal voltage conditions on the same components with the same temperature as those for the actively used components. For this purpose, the additional circuit 17 comprises a bipolar transistor 170 that represents an emulation of the bipolar transistor SQn. The emitter of the bipolar transistor 170 is additionally coupled via a resistor 171 to the reference potential terminal GND. This circuit structure of the additional circuit 17 corresponds to the arrangement of the bipolar transistor SQn and the reference resistor Rref. The additional circuit 17 further comprises an operational amplifier 172, a transistor 173 and a transistor 174.

The operational amplifier 172 is, like the operational amplifier 100 and the load current regulator 10*a*, coupled via a first input to the first reference signal terminal A6. A second input of the operational amplifier 172 is connected to a reference terminal RA2, which is in turn coupled to the emitter of the bipolar transistor 170 and to the resistor 171. The emitter current of the bipolar transistor 170 flows through the resistor 171 and generates a voltage drop. This voltage drop at the resistor 171 is compared by the operational amplifier 172 to the first reference voltage VREF. Based on this comparison, the operational amplifier 172 controls the transistor 173, which is connected to one output of the operational amplifier 172. A reference control signal IBREF is provided by the transistor 173 at an output coupled to a reference terminal RA1. The reference control signal IBREF is fed to the base of the bipolar transistor 170, which is connected to the reference terminal RA1. The transistor 174, which is likewise coupled to the output of the operational amplifier 172, emulates the reference control signal IBREF and routes this signal to the second reference signal source SP2 of the reference circuit 4*c*. The second reference signal source SP2 then adjusts the second reference current IBMON on the basis of the reference control signal IBREF.

Thus the threshold for the current gain factor is obtained from the additional circuit 17 and in particular by emulating the current source SQn in the form of the bipolar transistor 170. The current gain factor can either be derived directly from the bipolar transistor 170 or can be corrected by a defined factor. This fixed or adjustable factor is determined via possibly different electrical properties of the transistors 174 and 173 and/or the ratio of the resistances of 171 and Rref. The determination of the threshold value for the current gain factor by the resistors is advantageous because, in this case, the bipolar transistors can be selected without consideration of the current gain factor. In addition, a temperature dependency of the circuit arrangement can be avoided by the additional circuit 17, because the bipolar transistor 170 has substantially the same temperature behavior as the bipolar transistor SQn. A temperature dependency of the circuit arrangement is also reduced in that the additional circuit 17 is exposed to the same environmental conditions as is the active circuit portion for controlling the current source SQn.

The operation of the counter inside the signal converter 5 will now be described in detail. At its output, the monitoring device 11*b* generates the feedback signal RS. This feedback signal RS is used for controlling the counter.

The situation for incrementing the counter with the aid of the count signal UCS will first be considered. If the current gain factor falls below the defined threshold value, then this is a sign that the collector-emitter voltage VCE at the power source SQn is too low. In this case, the counter is incremented with the aid of the count signal UCS and taking into account the clock signal CLK1. The clock signal CLK1 causes a fast cycling when incrementing the counter. The effect of this is that the load voltage VL and thus the collector-emitter voltage VCE at the current source SQn is increased.

Now the decrementation of the counter will be considered. If there is no active feedback signal RS over a long period of time, the counter is decremented with the aid of the count signal DCS, taking into account the clock signal CLK2. In this case, the clock signal CLK2 leads to a slower cycle speed for decrementing. As a result of the decrementation, the load voltage VL and thus the collector-emitter voltage VCE of the current source SQn is reduced until the monitoring device 11*b* again provides an active feedback signal RS.

In summary, this means that the regulation of the load voltage VL alternates between two states. In the first state, the counter is incremented due to an active feedback signal RS until the feedback signal RS is suppressed because of the increased load voltage VL and thus the increased collector-emitter voltage VCE of the current source SQn. In the other state, the counter is decremented due to the lack of an active feedback signal RS until the monitoring device 11*b* again provides an active feedback signal RS because of an excessively low collector-emitter voltage VCE of the current source SQn.

In order to avoid switching back and forth between these two states, the monitoring device 11*b* can be implemented a second time in an embodiment that is not shown. This second monitoring device 11*b* has a somewhat higher threshold value for the current gain factor. If the second monitoring device 11*b* provides a second feedback signal, then the mode of operation of the counter can be modified as follows. If the feedback signal RS of any LED chain LK is active, the counter is incremented. If no feedback signal RS is active, but at least one second feedback signal is active, the counter remains in its current status. If neither the feedback signal RS nor the second feedback signal is active, the counter is decremented after a defined waiting time. The above-described switching of the counter between two different states can be avoided by this measure.

Figure 15:
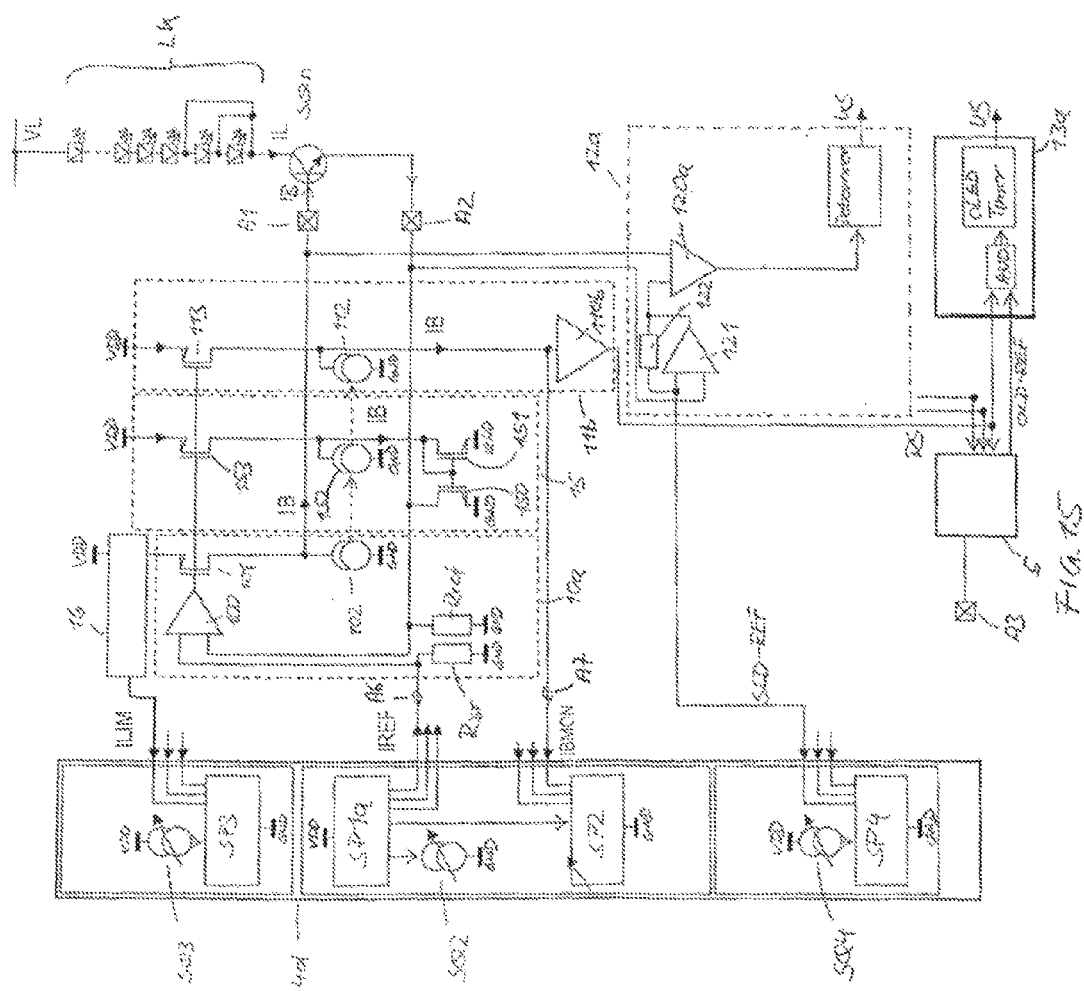

FIG. 15 shows an additional embodiment of a circuit arrangement for controlling a current source SQn that is coupled to an LED chain LK. The circuit structure of Figure substantially corresponds to the circuit arrangement of FIG. 12. In contrast to FIG. 12, the circuit arrangement from FIG. 15 additionally comprises a short-circuit detector 12*a* and an extended reference circuit 4*d*. The short-circuit detector 12*a* is used for detecting a short circuit inside the LED chain LK. The current source SQn in this example is realized as an NPN bipolar transistor. Detection of a short circuit can therefore be accomplished by monitoring the base-emitter voltage VBE of the NPN bipolar transistor SQn.

The short-circuit detector 12a comprises a comparator 120a, an operational amplifier 121, a resistor 122 and a debouncer. The first input of the operational amplifier 121 is connected to a third reference signal source SP4 of the reference circuit 4d. The third reference signal SP4 is connected to a reference potential terminal GND and a current source SQ4, which in turn is coupled to a terminal for feeding a supply voltage VDD. The third reference signal source SP4 is realized as a current mirror of the current source SQ4 and provides a third reference signal SLD-REF at a terminal coupled to the first input of the operational amplifier 121. The first input of the operational amplifier 121 is additionally connected to an output of the operational amplifier 121 via the resistor 122. This output of the operational amplifier 121 is also coupled to a first input of the comparator 122. A second input of the operational amplifier 121 is electrically connected to the load reference terminal A2 and thus to the emitter terminal of the NPN bipolar transistor SQn.

The operational amplifier 121 evaluates the signals at its first and second inputs and provides a reference voltage at its output for detecting a short circuit. This reference voltage represents the minimum value of the base voltage of the NPN bipolar transistor SQn in order to protect the bipolar transistor SQn from thermal destruction. The comparator 120a is coupled via a second input to the control terminal A1 and thus to the base of the NPN bipolar transistor SQn. The comparator 120a compares the momentary base voltage of the bipolar transistor SQn to the reference voltage provided by the operational amplifier 121, and based on this comparison, provides a comparison signal at an output that is coupled to the debouncer. The input-side voltages of the comparator 120a are each relative to a voltage potential at the emitter of the NPN bipolar transistor SQn. This permits a higher accuracy than a relation to the reference potential terminal GND.

The comparison signal of the comparator 120a is evaluated by the debouncer, which then provides a short circuit signal KS at its output. The debouncer is necessary to screen out transient signal fluctuations inside the circuit arrangement. Thereby a higher reliability for the provision of the short-circuit signal KS is achieved.

The short-circuit signal KS is routed to a channel controller 2, not shown, which then deactivates the load current regulator 10a. The current source SQn is switched off due to the deactivation of the load current regulator 10a and is therefore protected from thermal destruction. The threshold value for a short-circuit recognition can be modified by an adjustment of the third reference signal SLD-REF, in particular a third reference current SLD-REF. The threshold value for the third reference current SLD-REF should be chosen in such a manner that the threshold for the junction temperature of the bipolar transistor SQn moves in a range from 110° C. to 140° C.

If a short-circuit is present inside the LED chain LK, a high collector-emitter voltage VCE drops at the bipolar transistor SQn. This high collector-emitter voltage VCE for a given load current IL leads to an overheating of the bipolar transistor SQn. In the normal operating situation of the bipolar transistor SQn, a low collector-emitter voltage VCE, in the range of up to 2 V, drops at the bipolar transistor SQn. Consequently, the power loss for a load current IL of 100 mA through the LED chain LK has a value of 200 mW. In the case of a short-circuited LED, the collector-emitter voltage VCE rises to a value of 3 V, which leads to a power loss of 500 mW. Two short-circuited LEDs logically lead to an increase of the collector-emitter voltage VCE by 6 V and a power loss of 800 mW. As a consequence of the power loss, the junction temperature of the bipolar transistor SQn increases. As already explained extensively in the description of FIG. 6, the base-emitter voltage VBE of the bipolar transistor SQn therefore declines (approx. 2 mV/K).

In summary, the monitoring of the base-emitter voltage VBE of the bipolar transistor SQn permits the detection of a higher power loss caused by a fault event and therefore also the recognition of a short-circuit of one or more LEDs inside the LED chain LK.

In the above described embodiment of the short-circuit detector 12a, the junction temperature of the bipolar transistor SQn is compared to a constant temperature threshold that is specified via a constant third reference current SLD-REF. This can have the effect that, especially at low ambient temperatures, a short circuit of several LEDs is necessary in order to be able to detect a short circuit reliably. Because the ambient temperature is available inside the circuit arrangement, the third reference current SLD-REF can be designed in another embodiment to be dependent on the ambient temperature. The necessary correction of the influences from the ambient temperature is achieved via a negative temperature coefficient of the third reference current SLD-REF. The third reference current with the negative temperature coefficient can be derived from a reference semiconductor component. With the aid of this circuit arrangement, a deviation in the heating of a specific NPN bipolar transistor SQn can be recognized independently of the current ambient temperature. Thereby a higher reliability of the short-circuit recognition is achieved.

In another embodiment of the short-circuit detector 12a, an external emulated reference transistor can be used in order to take the temperature dependence of the circuit arrangement into account. A component-specific and environment-dependent base-emitter voltage VBE is provided via this reference transistor. This base-emitter voltage VBE is then compared to the currently measured base-emitter voltage VBE of the bipolar transistor SQn. If the base-emitter voltage VBE of the bipolar transistor SQn falls far below the base-emitter voltage VBE of the reference transistor, then a short circuit is present. In this embodiment as well, a deviation in the heating of a specific NPN bipolar transistor is recognized independently of the ambient temperature.

Figure 16:
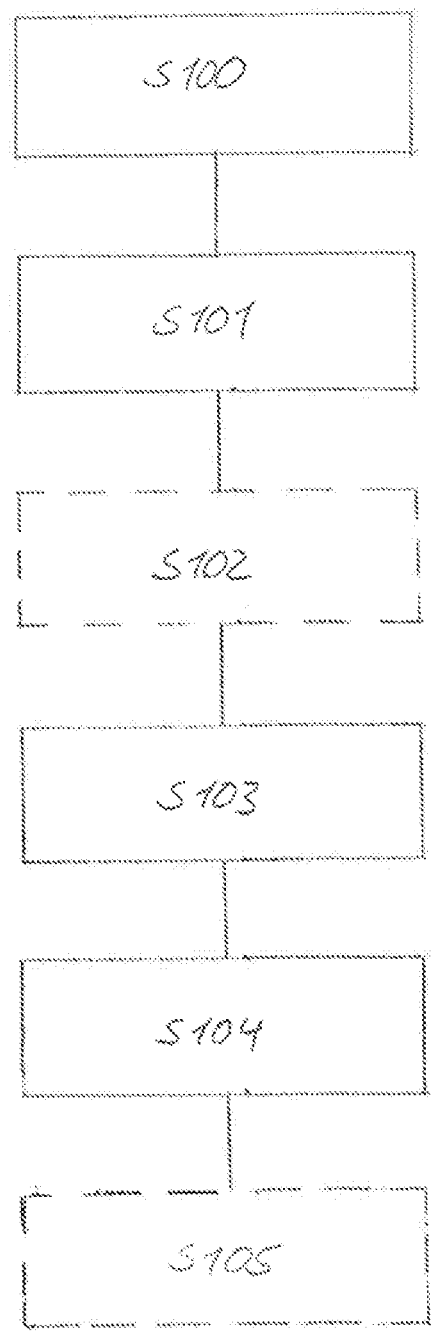
FIG. 16 shows process steps of a method for controlling a current source coupled to a load.

FIG. 16 shows process steps S100 to S105 for controlling a current source SQn coupled to a load LK. A load current IL flows through the load LK.

Process step S100 comprises comparing the load current or a variable derived from the load current IL to a first reference signal IL-REF, IREF, VREF. In this embodiment, the first reference signal IL-REF, IREF, VREF is implemented as a first reference current IREF. In an alternative embodiment, not shown, the first reference signal IL-REF, IREF, VREF can also be realized as a first reference voltage VREF.

In process step S101, a control signal IB is provided, based on the comparison of the load current IL or the variable derived from the load current IL to the first reference current IREF. In this embodiment, the control signal IB corresponds to a control current IB for controlling the current source SQn.

The further process step S103 comprises comparing the control current IB or a variable derived from the control current IB to the load current IL or the variable derived from the load current IL. In this embodiment, a first voltage, which the control current IB generates at a first resistor, is compared to a second voltage, which the load current IL generates at a second resistor.

In process step S104, a feedback signal RS is provided based on the comparison of these two voltages. The feedback signal RS in turn controls a load voltage VL, which drops across the current source SQn and the load LK.

Process step S103 further comprises the determination of a gain factor. In this embodiment, the gain factor corresponds to a current gain factor that is determined from the comparison of the control current IB or the variable derived from the control current IB to the load current IL or the variable derived from the load current IL. The feedback signal RS is provided on the basis of the current gain factor.

The illustrated method can further comprise a process step S102, in which the control current IB is subtracted from an output current of the current source SQn. Thus a current, which corresponds to the load current IL, is provided for controlling the control current IB and/or for determining the current gain factor.

In another embodiment, the method for controlling the current source SQn has an additional process step S105. In this step, the difference signal is compared to a third reference signal SLD-REF in order to detect a short circuit inside the load LK. The difference signal is picked off at different terminals of the current source SQn and preferably corresponds to a base-emitter voltage VBE of the current source SQn. The third reference signal SLD-REF is preferably adjustable and in particular is dependent on the temperature.

The invention claimed is:

1. A control loop arrangement for controlling a current source that supplies a load, the control loop arrangement comprising:
   a first control loop for controlling a control signal that is designed to control the current source, and thus a load current, that flows through the current source and the load, wherein a control variable of the first control loop corresponds to a compensated load current derived from the load current, and wherein a command variable of the first control loop is a first reference signal;
   a second control loop for controlling a load voltage that drops across the current source and the load, wherein a control variable of the second control loop corresponds to the compensated load current, and wherein a command variable of the second control loop is the control signal or a variable derived from the control signal; and
   compensation means which are designed to generate the compensated load current by subtracting the control signal from the load current.

2. The control loop arrangement according to claim 1, wherein the control variable of the first and second control loops is a control voltage that the compensated load current generates at a reference resistor.

3. The control loop arrangement according to claim 1, wherein the control variable of the first control loop is the control voltage, and wherein the control variable of the second control loop is a second reference signal, which is determined on the basis of the control variable of the first control loop.

4. The control loop arrangement according to one of claims 1-3, further comprising:
   a short circuit detector that is designed to detect a short circuit inside the load and to drive the first and second control loops on the basis thereof.

5. A circuit arrangement for controlling a current source that supplies a load, the circuit arrangement comprising:
   a control terminal, which is designed to provide a control signal for controlling the current source;
   a load reference terminal, which can be coupled to an output of the current source and is designed to provide a load current that flows through the current source and the load, or a variable derived from the load current;
   a first reference signal terminal, which can be coupled to a first reference signal source and is designed to provide a first reference signal;
   a load current regulator, which is coupled on the input side to the first reference signal terminal and the load reference terminal, and is designed to provide the control signal at an output that is coupled to the control terminal, on the basis of a comparison of the load current or the variable derived from the load current to the first reference signal;
   a feedback terminal, which is designed to provide an external feedback signal for adjusting a load voltage that drops across the current source and the load coupled to it;
   a monitoring device, which is coupled on the input side to the output of the load current regulator and one of the inputs of the load current regulator, and is designed to provide the feedback signal at an output that is connected to the feedback terminal, on the basis of a comparison of the control signal or a variable derived from the control signal to the load current or the variable derived from the load current; and
   a compensation circuit, which is coupled to the load reference terminal and is designed to subtract the control signal from an output current emitted by the current source.

6. The circuit arrangement according to claim 5, wherein the one input of the load current regulator is coupled to the load reference terminal.

7. The circuit arrangement according to claim 5, further comprising:
   a second reference signal terminal, which can be coupled to a second reference signal source to supply a second reference signal, wherein the second reference signal source is coupled to the first reference signal source, and wherein the one input of the load current regulator is coupled to the second reference signal terminal.

8. The circuit arrangement according to claim 7, wherein the second reference signal can be adjusted on the basis of an additional circuit, the temperature behavior of which substantially corresponds to a temperature behavior of the current source.

9. The circuit arrangement according to one of claims 5-8, comprising:
   a short-circuit detector, which is coupled to the load reference terminal and the control terminal and is designed to provide a short-circuit signal on the basis of a difference signal between these two terminals and a third reference signal.

10. The circuit arrangement according to claim 9, wherein the current source comprises a transistor, and wherein the difference signal corresponds to a base-emitter voltage.

11. A method for controlling a current source that supplies a load, the method comprising:
    comparing a load current that flows through the current source and the load, or a variable derived from the load current, to a first reference signal;
    providing a control signal on the basis of the comparison of the load current or the variable derived from the load current to the first reference signal, wherein the control signal controls the current source;
    comparing the control signal or the variable derived from the control signal to the load current or the variable derived from the load current;
    providing a feedback signal on the basis of the comparison of the control signal or the variable derived from the control signal to the load current or the variable derived from the load current, wherein the feedback signal regulates a load voltage that drops across the current source and the load; and subtracting the control signal from an output current of the current source in order to obtain the load current for regulating the control signal or for determining the gain factor.

12. The method according to claim 11, further comprising:

determining a gain factor from the comparison of the control signal or the variable derived from the control signal to the load current or the variable derived from the load current, wherein the control signal corresponds to a control current and the gain factor to a current gain factor; and providing the feedback signal on the basis of the current gain factor.

13. The method according to claim 11 or 12, further comprising:

comparing a difference signal, which can be picked off at the terminals of the current source and preferably corresponds to a base-emitter voltage of a transistor, to a third reference signal, which is preferably adjustable and is dependent on the temperature in particular, in order to detect a short circuit inside the load.

* * * * *